(12) United States Patent
Isaac et al.

(10) Patent No.: US 11,433,434 B2
(45) Date of Patent: Sep. 6, 2022

(54) ACCESS MAT WASHING SYSTEMS AND RELATED METHODS

(71) Applicant: Randell Isaac, Sexsmith (CA)

(72) Inventors: Randell Isaac, Sexsmith (CA); Caleb Becker, Sexsmith (CA); Kelly Hewko, Sexsmith (CA)

(73) Assignee: Randell Isaac, Sexsmith (CA)

(*) Notice: Subject to any disclaimer, the term of this patent is extended or adjusted under 35 U.S.C. 154(b) by 0 days.

(21) Appl. No.: 17/200,621

(22) Filed: Mar. 12, 2021

(65) Prior Publication Data

US 2022/0016676 A1 Jan. 20, 2022

(30) Foreign Application Priority Data

Mar. 11, 2020 (CA) .................. CA 3078055

(51) Int. Cl.
*B08B 3/02* (2006.01)
*B08B 3/14* (2006.01)
*B65G 47/90* (2006.01)

(52) U.S. Cl.
CPC ............... *B08B 3/022* (2013.01); *B08B 3/14* (2013.01); *B65G 47/904* (2013.01)

(58) Field of Classification Search
None
See application file for complete search history.

(56) References Cited

U.S. PATENT DOCUMENTS

| | | | |
|---|---|---|---|
| 2,269,807 A | 1/1942 | Buckley | |
| 2,851,711 A | 9/1958 | Stehling | |
| 5,372,153 A | 12/1994 | Dobson | |
| 8,277,566 B2 | 10/2012 | Rubenzer | |
| 2011/0017245 A1 | 1/2011 | Vernon | |
| 2014/0014143 A1 | 1/2014 | Kennedy | |
| 2017/0259307 A1 | 9/2017 | Francis | |
| 2018/0155866 A1 | 6/2018 | Brennan | |

FOREIGN PATENT DOCUMENTS

| | | |
|---|---|---|
| CA | 2911836 | 1/2016 |
| CN | 104415935 A | 3/2015 |
| JP | 200015193 | 1/2000 |
| JP | 2001170576 | 6/2001 |

(Continued)

OTHER PUBLICATIONS

Chris Layton, Dale Layton, Four Seasons Mat Washing, screenshots taken from the Wayback Machine Internet archive dated Aug. 21, 2018, Red Deer AB, url=<https://web.archive.org/web/20180821043303/https://fourseasonsmatwashing.com/>, 1 Page.

(Continued)

*Primary Examiner* — Rita P Adhlakha
(74) *Attorney, Agent, or Firm* — Robert A. Nissen

(57) ABSTRACT

A mat washing system includes: a structural mainframe; a mat washing station; a conveyor structured to translate a mat, while the mat is an upright position, along the structural mainframe through the mat washing station; and a mat loading swing arm on the structural mainframe and structured to grip a fouled mat, which in use is stacked on or adjacent a mat loading zone of the structural mainframe, and tilt the fouled mat onto the conveyor into the upright position. A method involves using a mat washing system to wash a fouled mat.

20 Claims, 10 Drawing Sheets

(56) References Cited

FOREIGN PATENT DOCUMENTS

KR          101470285          12/2014

OTHER PUBLICATIONS

Northern Mat & Bridge, Northern Mat & Bridge's Automated Mat Washer, The Matador! Screenshots of Youtube video, video published on Aug. 9, 2016, url= <https://www.youtube.com/watch?v=2UJQVIyPckw>, 2 pages.

Strad, Mobile Mat Washing Unit, product description, 1 page, Nov. 9, 2019, stradinc.com.

Hot and Mighty Direct, "Automated Rig Mat Cleaning", website and video,screenshots taken from the Wayback Machine Internet archive dated Nov. 9, 2019, url=<https://www.hotandmightydirect.com/products/access-mat-rig-mat-cleaning-with-recycling-equipment>, 8 pages.

Galloway Construction Group Ltd., "Our Work", screenshots taken from the Wayback Machine Internet archive dated Oct. 25, 2017, url=<https://web.archive.org/web/20171025051048/http7/gallowayconstruction.ca/our-work#outcome-electrical-transmission-lines>, 6 pages.

Pioneer Mat Washing, 3 screenshots from video, dated Nov. 9, 2019, URL="http://pioneermatwashing.com", 1 page.

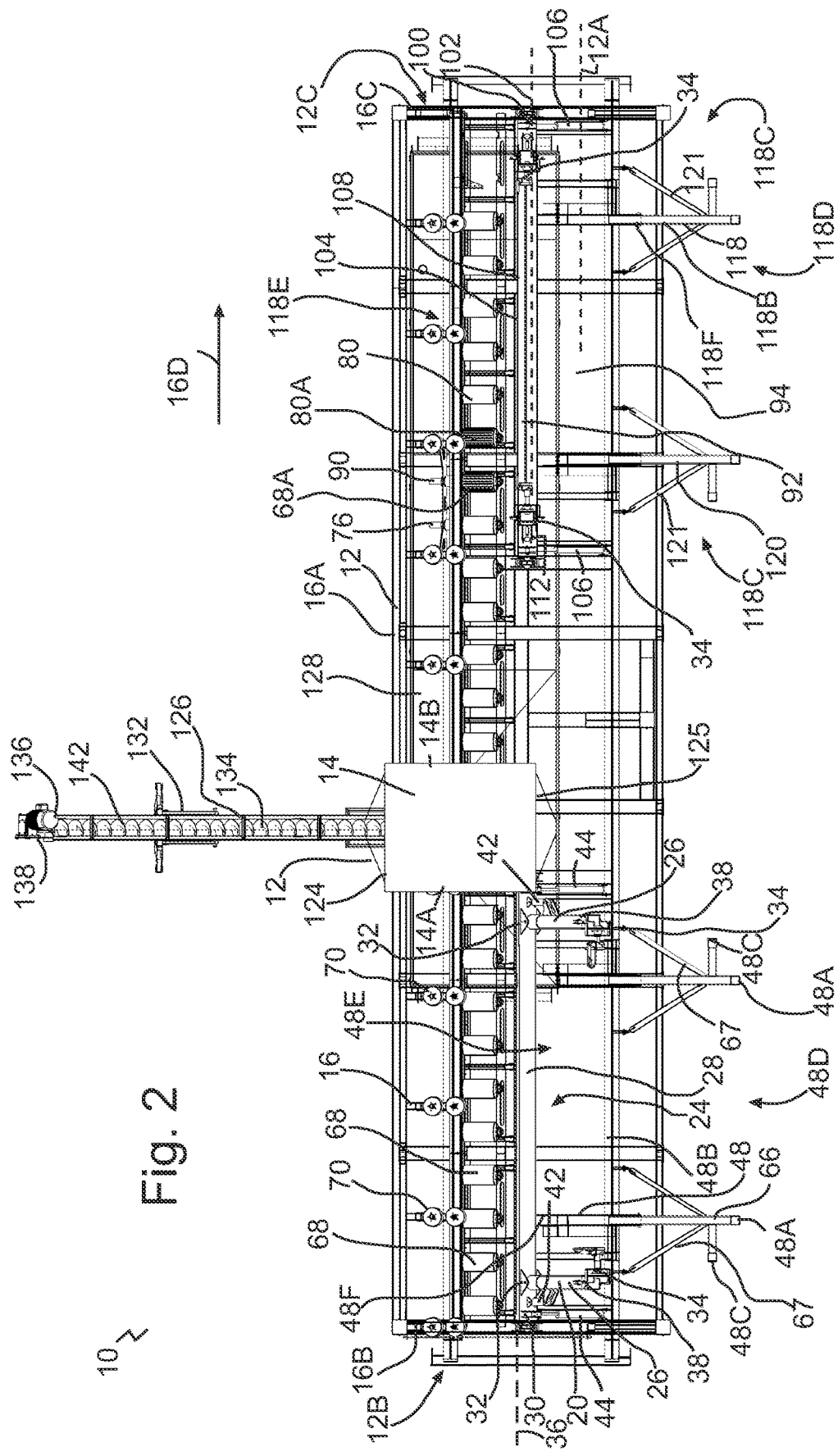

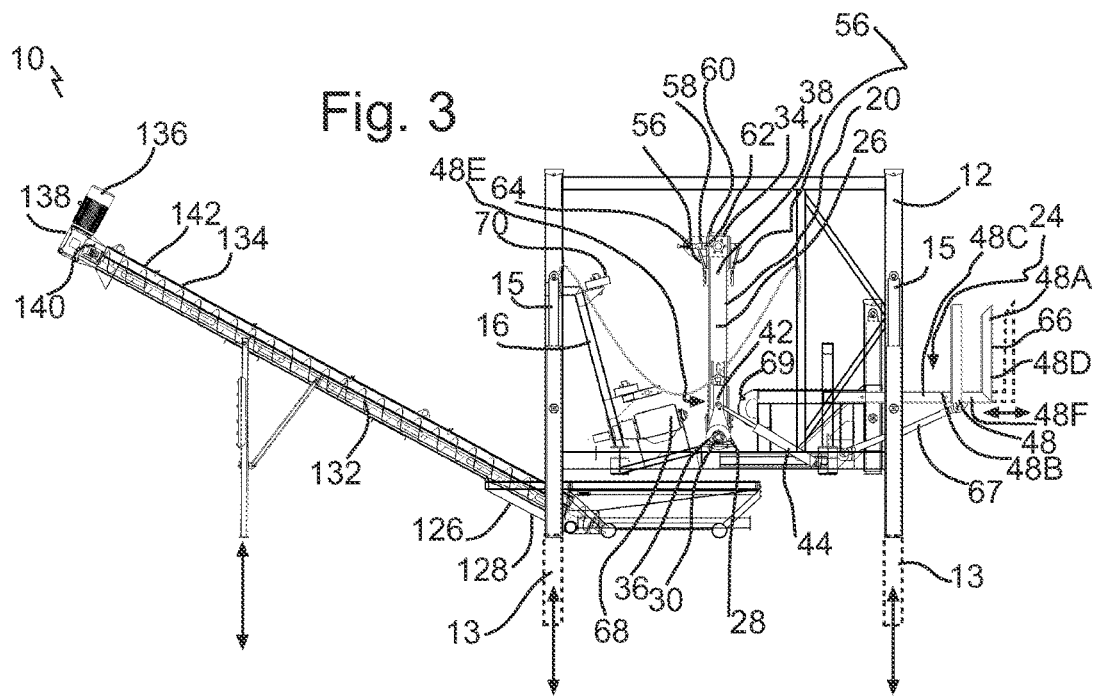
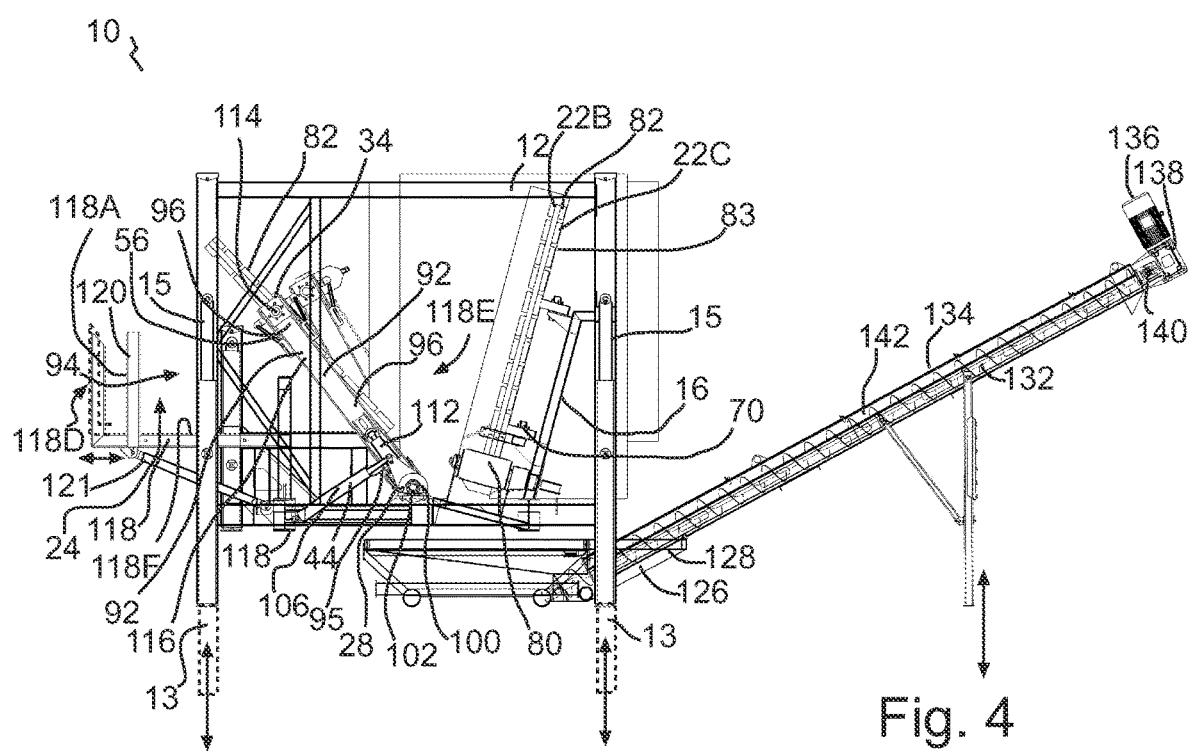

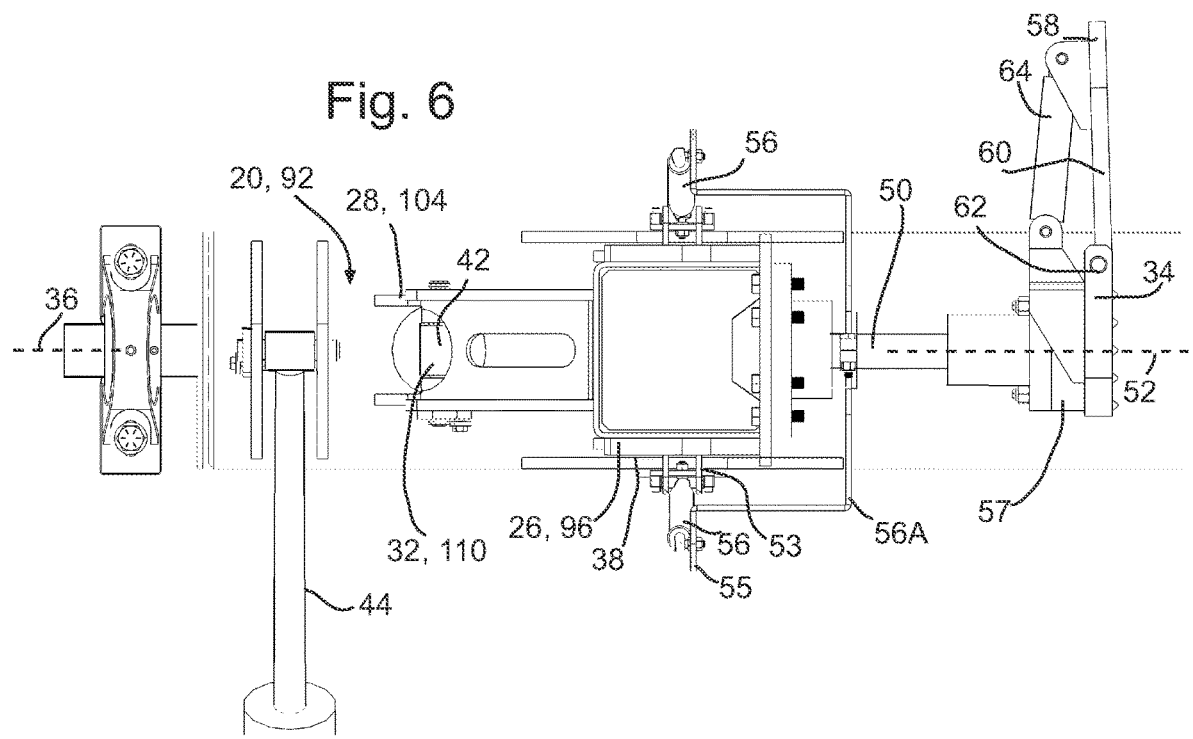
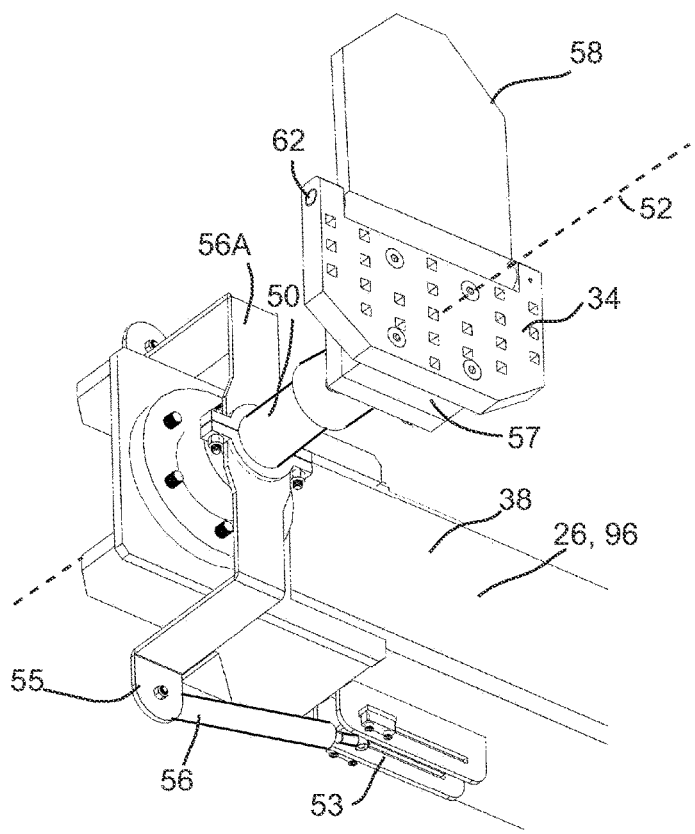

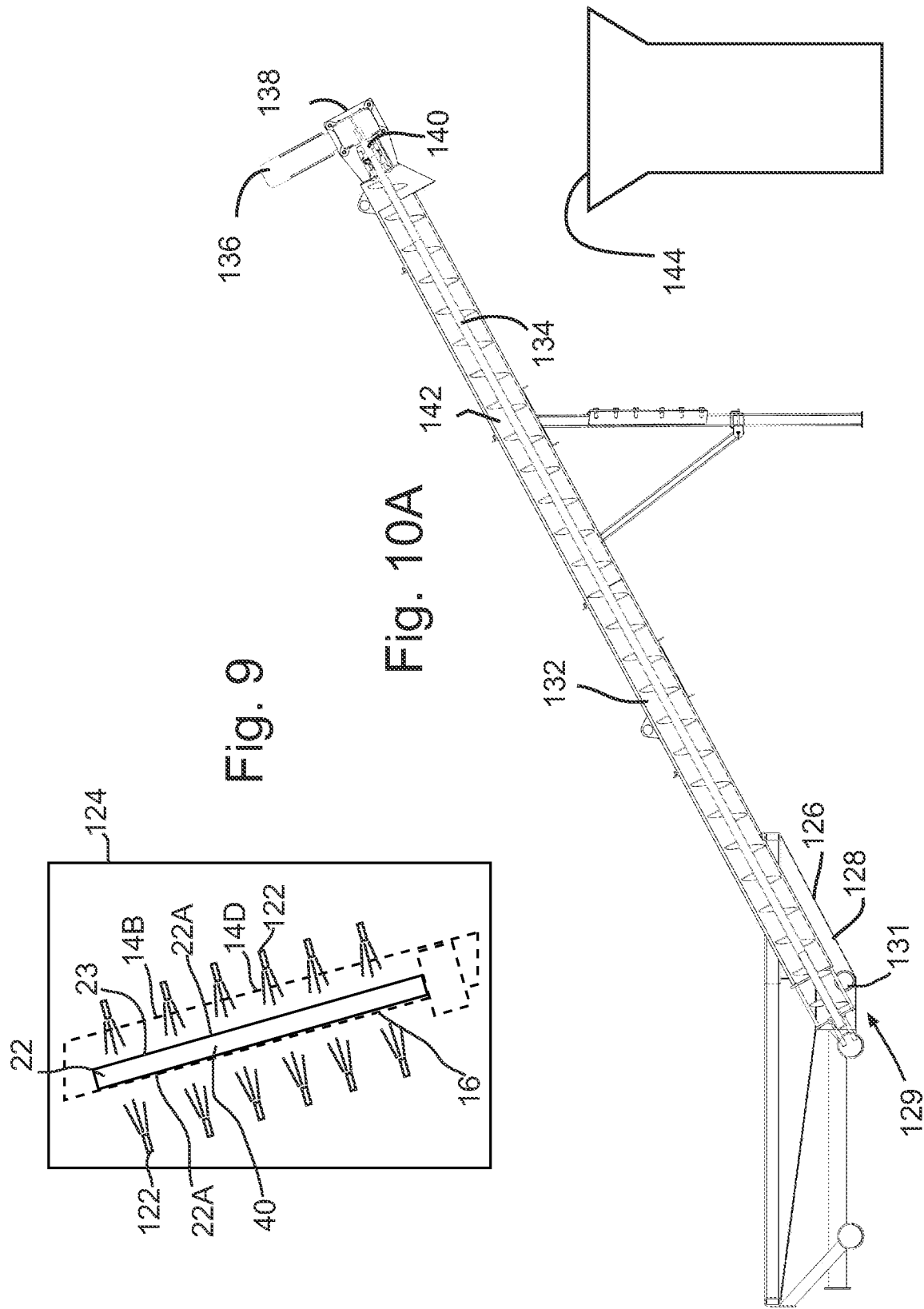

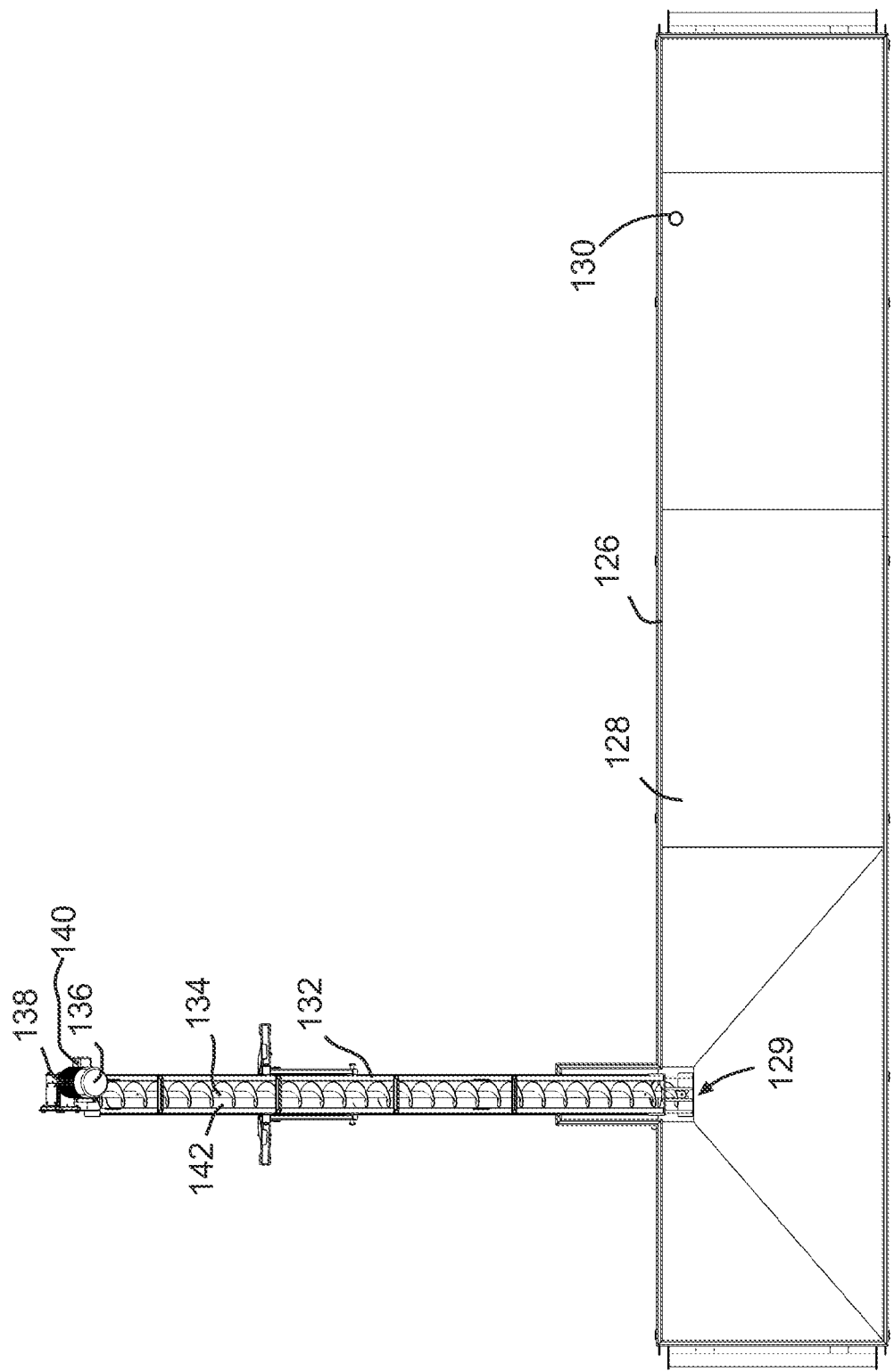

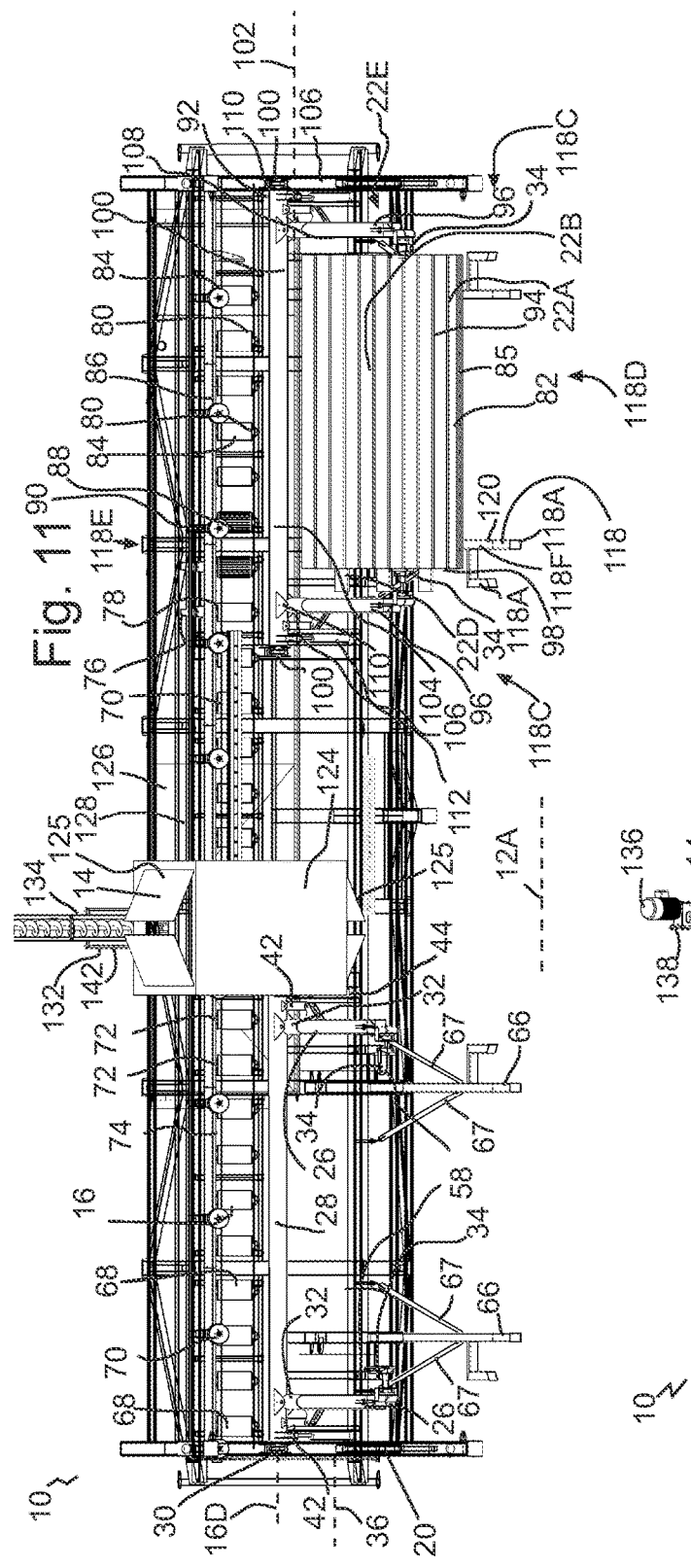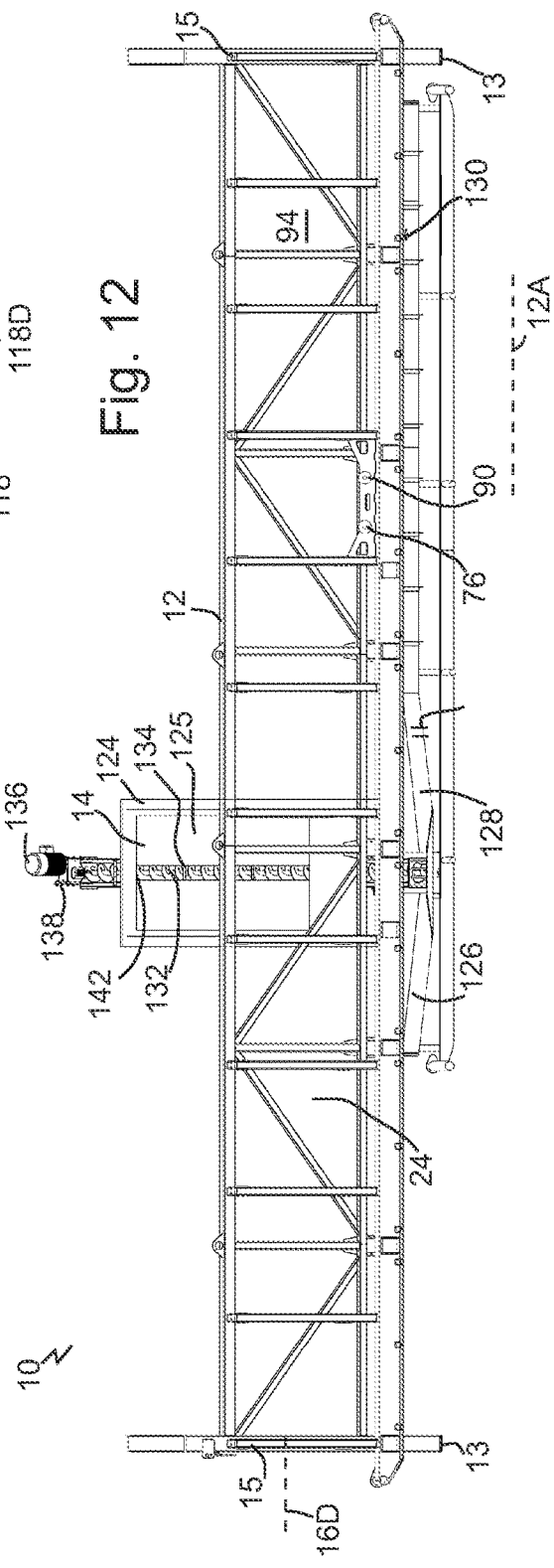

ACCESS MAT WASHING SYSTEMS AND RELATED METHODS

TECHNICAL FIELD

This document relates to mat washing systems and related methods.

BACKGROUND

The following paragraphs are not an admission that anything discussed in them is prior art or part of the knowledge of persons skilled in the art.

Access mats are used to provide temporary roads and equipment platforms in remote or undeveloped areas of land. One common use of access matting is in oil and gas well exploration, where access mats may be used to access and located a drilling rig in a remote location. During use access mats become dirty and may require cleaning prior to relocation and re-use. Mat washing systems may be used that wash such mats while the mats are in a flat, horizontal or upright orientation. Example mat washing systems include the MATADOR™, a system that uses a loading section that tilts a stack of mats from horizontal to vertical and then advances the mats through a washing system using a sliding overhead carriage. Roller assemblies are used in other systems to convey mats through a mat washer.

SUMMARY

The foregoing summary is not intended to summarize each potential embodiment or every aspect of the subject matter of the present disclosure. These and other aspects of the device and method are set out in the claims.

A mat washing system is disclosed comprising: a structural mainframe; a mat washing station; a conveyor structured to translate a mat, while the mat is an upright position, along the structural mainframe through the mat washing station; and a mat loading swing arm on the structural mainframe and structured to grip a fouled mat, which in use is stacked on or adjacent a mat loading zone of the structural mainframe, and tilt the fouled mat onto the conveyor into the upright position.

A method is disclosed comprising using a mat washing system to wash a fouled mat.

A method is disclosed comprising: gripping a fouled mat, which is stacked on or adjacent a mat loading zone of a structural mainframe, using a mat loading swing arm on the structural mainframe; tilting the fouled mat, using the mat loading swing arm, into an upright position onto a conveyor of the structural mainframe; conveying the fouled mat to a mat washing station; and washing the fouled mat in the mat washing station to produce a washed mat.

Access mats, such as rig mats, may be cleaned using the disclosed methods and apparatus. Other types of mats may also be cleaned.

In various embodiments, there may be included any one or more of the following features: The mat loading swing arm comprises two mat loading swing arms having respective grippers, that cooperate to clamp opposed surfaces of the fouled mat to grip the fouled mat. The mat loading zone is adjacent a side of the conveyor. The mat loading swing arms are structured to tilt the fouled mat from the mat loading zone so that a face of the fouled mat moves in a lateral direction toward and onto the side of the conveyor. The mat loading swing arms are structured to clamp opposed end edges of the fouled mat to grip the fouled mat. An actuator or actuators connected to converge and diverge the respective grippers relative to one another to grip and release, respectively, the fouled mat. Each respective gripper is mounted to pivot relative to the mat loading swing arm. Each respective gripper is mounted to permit passive motion of the respective gripper and fouled mat relative to the mat loading swing arm by force of gravity. Each respective gripper has a dampener to cushion rotation. The mat loading swing arms are structured to position the respective grippers to clamp the opposed surfaces of the fouled mat at a pivot axis that is farther from a loading swing axis, of the mat loading swing arms, than a center of gravity longitudinal axis of the fouled mat, the pivot axis being parallel to the loading swing axis and the center of gravity longitudinal axis. The mat loading swing arms are structured to swing about a loading swing axis that is parallel to a translation axis of the conveyor. A mat loading subframe on the structural mainframe and that defines the mat loading zone for receiving a stack of fouled mats. The mat loading subframe has extendable and retractable members for extending and retracting, respectively, the mat loading zone. The extendable and retractable members are structured to move by telescopic motion. The mat loading subframe defines a cage for receiving the stack of fouled mats. A first drive connected to drive a first portion of the conveyor, upstream of the mat washing station. A second drive connected to drive a second portion of the conveyor, at or downstream of the mat washing station, independently of the first drive. A mat unloading swing arm on the structural mainframe and structured to grip a washed mat, which in use is on the conveyor in the upright position, and stack the washed mat on or adjacent a mat unloading zone of the structural mainframe. The mat unloading swing arm comprises two mat unloading swing arms having respective grippers that cooperate to clamp opposed surfaces of the mat to grip the washed mat. The mat unloading zone is adjacent a side of the conveyor. The mat unloading swing arms are structured to tilt the mat so that a face of the fouled mat moves in a lateral direction away from the side of the conveyor onto the mat unloading zone. The mat unloading swing arms are structured to clamp opposed end edges of the washed mat to grip the washed mat. An actuator or actuators connected to converge and diverge the respective grippers relative to one another to grip and release, respectively, the washed mat. Each respective gripper is mounted to permit passive motion of the respective gripper and washed mat relative to the mat loading swing arm by force of gravity. Each respective gripper is mounted to pivot relative to the mat unloading swing arm by force of gravity. Each respective gripper pad has a dampener to cushion rotation. The mat unloading swing arms are structured to position the respective grippers to clamp the opposed surfaces of the washed mat at a pivot axis that is farther from an unloading swing axis, of the mat unloading swing arms, than a center of gravity longitudinal axis of the washed mat, the pivot axis being parallel to the unloading swing axis and the center of gravity longitudinal axis. The mat unloading swing arms are structured to swing about an unloading swing axis that is parallel to a translation axis of the conveyor. A mat unloading subframe on the structural mainframe and that defines the mat unloading zone for receiving a stack of washed mats. The mat unloading subframe has extendable and retractable members for expanding and retracting, respectively, the mat unloading zone. The extendable and retractable members are structured to move by telescopic motion. The mat unloading subframe defines a cage for receiving the stack of washed mats. The conveyor is structured to translate the mat while the mat is the upright position at a tilted orientation between 95 and 135 degrees from horizontal. The mat loading swing arm is structured to release the mat onto the conveyor in the upright position. The mat washing station comprises a plurality of nozzles oriented to direct washing fluids against the fouled mat while the fouled mat is the upright position. A spent washing fluid collection basin associated with the conveyor. A debris removal conveyor mounted to separate debris from spent washing fluids from the spent washing fluid collection basin. The debris removal conveyor comprises an auger that is oriented to direct debris upward away from, and liquid downward back to, the spent washing fluid collection basin. A filter screen connected to receive debris directed from the auger. The structural mainframe forms a skid or trailer. Using the mat washing system to wash a fouled mat. The mat loading swing arm comprises two mat loading swing arms each having a respective gripper; and gripping comprises converging the respective grippers to clamp opposed end edges of the fouled mat. During gripping, the fouled mat is located within a stack of fouled mats received within a mat loading subframe of the structural mainframe. The mat loading subframe is adjacent a side of the conveyor; and tilting comprises tilting the fouled mat from the mat loading zone so that a face of the fouled mat moves in a lateral direction toward and onto the side of the conveyor. During tilting, the fouled mat self-orients by gravity relative to the mat loading swing arms. Driving the fouled mat along the conveyor toward the mat washing station using a first drive; and driving the washed mat along the conveyor away from the mat washing station using a second drive independent of the first drive. Conveying the washed mat away from the mat washing station; gripping the washed mat using a mat unloading swing arm on the structural mainframe; and tilting the washed mat, using the mat unloading swing arm, from the upright position into a stack of washed mats at or adjacent a mat unloading zone of the structural mainframe. The mat unloading swing arm comprises two mat unloading swing arms having respective grippers; and gripping the washed mat comprises converging the respective grippers to clamp opposed end edges of the washed mat. The stack of washed mats is on a mat unloading subframe of the structural mainframe; the mat unloading subframe is adjacent a side of the conveyor; and tilting comprises tilting the washed mat from the conveyor so that a face of the fouled mat moves in a lateral direction away from the side of the conveyor. During tilting, the washed mat self-orients by gravity relative to the mat unloading swing arms. The fouled mat is conveyed while the mat is the upright position at a tilted orientation between 95 and 135 degrees from horizontal. At or during tilting of the fouled mat into the upright position the washed mat is released onto the conveyor. In which the fouled mat is washed at the mat washing station using washing fluids; and further comprising collecting and recycling spent washing fluids. Stacking the fouled mat at the mat loading zone by forklift or grapple; and removing the washed mats at a mat unloading zone of the structural mainframe by forklift, grapple, or excavator.

BRIEF DESCRIPTION OF THE FIGURES

Embodiments will now be described with reference to the figures, in which like reference characters denote like elements, by way of example, and in which:

FIG. 2 is a top plan view of the mat washing system of FIG. 1, with the stack of fouled mats removed for clarity.

FIGS. 3 and 4 are end elevation views of loading and unloading ends, respectively, of the mat washing system of FIG. 1.

FIGS. 6 and 7 are top plan and perspective views, respectively, of a gripper of a swing arm from the mat washing system of FIG. 1.

FIG. 9 is a side elevation view of a mat washing station of the mat washing system of FIG. 1, simplified for clarity.

FIG. 10A is an end elevation view of the mat washing station of the mat washing system of FIG. 1, illustrating the spent washing fluids collection basin, with a debris auger separating and supplying debris from the basin into a debris collector.

FIG. 10B is a top plan view of the debris auger and spent washing fluids collection basin of FIG. 10A.

FIG. 11 is a top plan of a section view of the mat washing system of FIG. 1 taken along the 11-11 section lines of FIG. 8, illustrating a series of sprockets for driving the conveyor of the mat washing system of FIG. 1, with part of the structural mainframe removed for clarity.

FIG. 12 is a section view of the mat washing system of FIG. 1 taken along the 12-12 section lines of FIG. 8, illustrating a pair of drives for driving the conveyor of the mat washing system of FIG. 1, with part of the structural mainframe removed for clarity.

DETAILED DESCRIPTION

Immaterial modifications may be made to the embodiments described here without departing from what is covered by the claims.

In industries including construction, oil and gas exploration, extraction and transportation, forestry, agriculture and others, access mats may be used to provide a temporary stable surface with a sufficient bearing capacity for the transport of heavy equipment, vehicles, and personnel. Access mats prevent or reduce soil erosion, delay and expense associated with equipment becoming stuck in otherwise unmated unstable soils, and overall reduce non-productive time in construction operations. Furthermore, access matting may reduce the risk of damage to the environment during construction operations by providing a barrier for spills and runoff, as well as decreasing reclamation demands of abandoned work sites.

Depending on the industry, access mats may alternatively be termed rig mats, construction mats, pipeline mats, road mats, portable roadways, swamp mats or others. Such mats are generally large, flat, rigid panels, and in some cases may be too heavy to be moved without heavy equipment such as a front-end loader, crane, or excavator. Commonly, such mats are constructed from plural layers of lumber held together with carriage bolts, adhesives, or other fasteners. Such mats may also be constructed from materials other than lumber, such as fiberglass-reinforced plastic, or other relatively lightweight yet sufficiently strong bearing materials. Some matting may be form using lumber (such as wooden boards) supported by or within a metal frame. Access mats are available in many sizes but in some cases it may be desirable that such mats be sufficiently small enough to be transported by convenient means, for example on a trailer flatbed without requiring an oversize highway load permit, or within an standard size intermodal freight transport container, such as an 8' (w)×40' (l) container.

Figure 1:
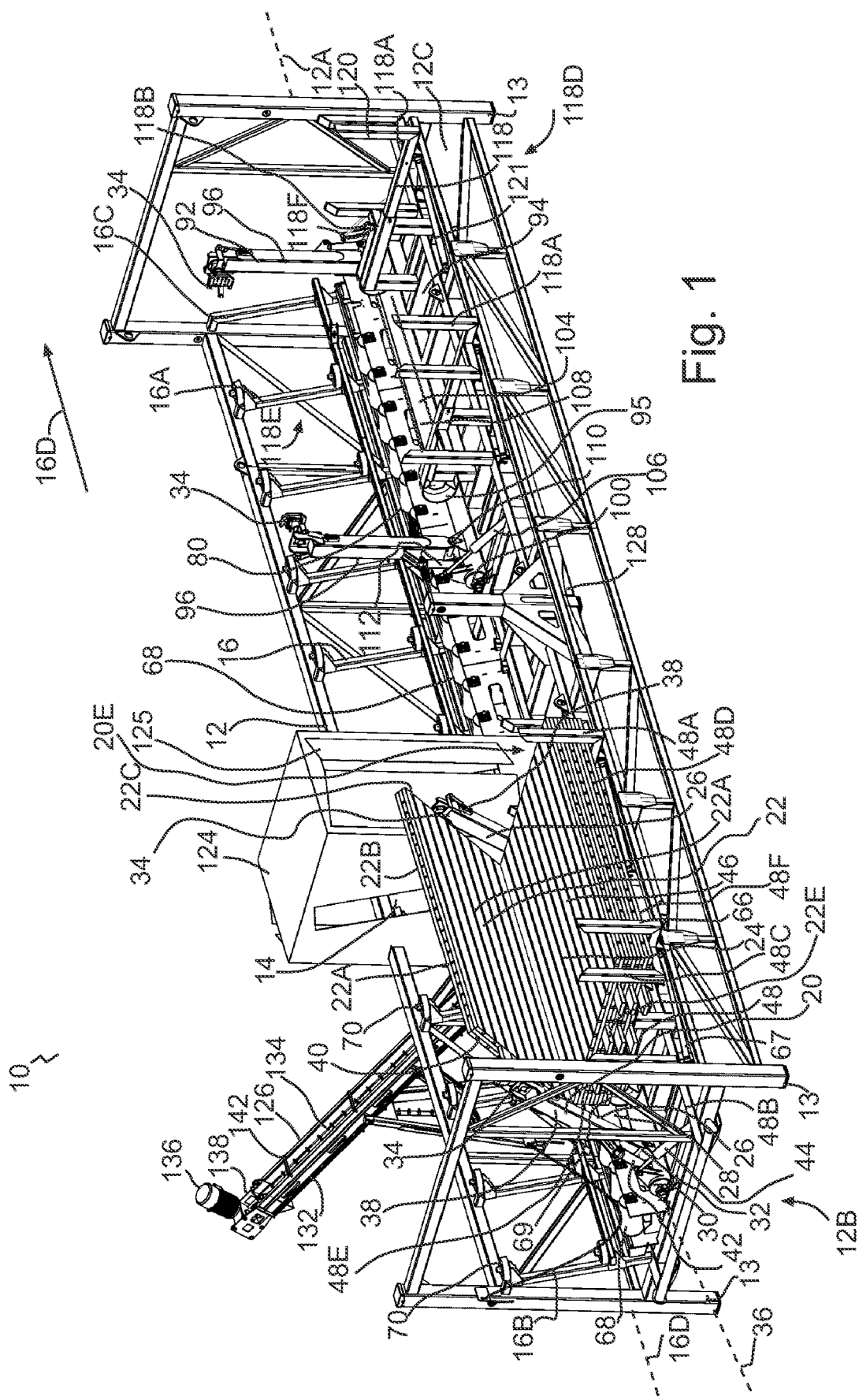
FIG. 1 is a perspective view of a mat washing system.
Figure 8A:
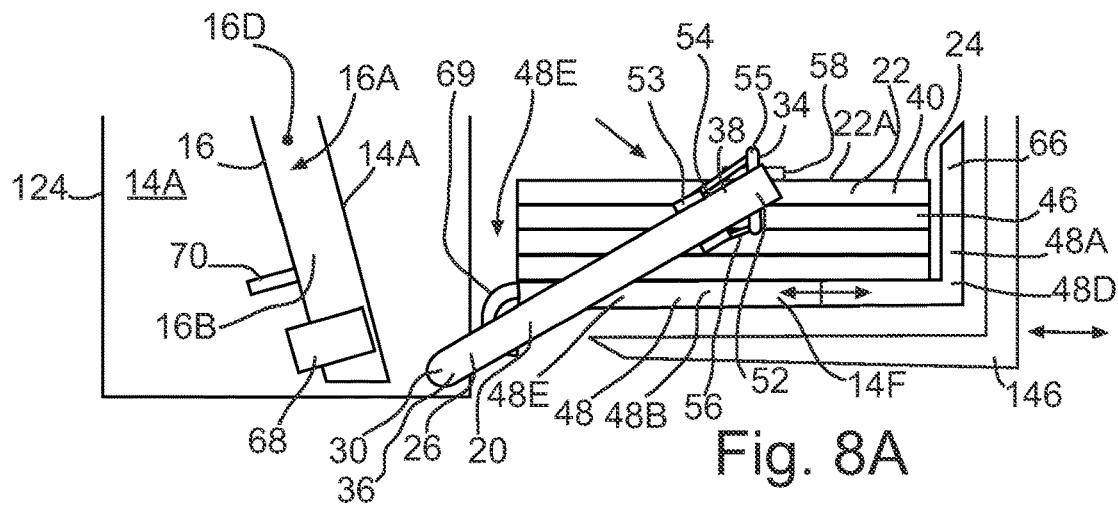
FIGS. 8A-C are a series of end elevation views, of the mat loading zone of the mat washing system of FIG. 1, illustrating a pair of loading swing arms gripping a stacked mat (FIG. 8A), tilting the mat toward the conveyor (FIG. 8B), and loading and releasing the mat onto the conveyor (FIG. 8C), with the structure in the views simplified for clarity.

Referring to FIGS. 1 and 8A, an example mat 22 may have opposed faces 22A, and edges, such as longitudinal edges 22B and end edges 22C, separating the faces 22A. The faces 22A may define an outer perimeter with a rectangular shape when viewed from above or below, although other shapes may be used. In use, access mats may be laid edge to edge. When laid in place such mats form a network as identified by the intersecting side and end lines of the edges of the mats. Each mat 22 may have a mechanism for facilitating manipulation of the mat, such as eyelets or hooks for lifting devices such as a crane.

Referring to FIG. 1, an example mat 22 may be formed of a plurality of layers stacked one on the other and laminated or fastened together, for example with hydrophobic adhesive such as a polyurethane adhesive. Each layer may comprise a plurality of boards laid edge to edge relative to one another so that the top and base faces of each mat may collectively define top and base surfaces, respectively.

Referring to FIGS. 1 and 11, an access mat 22 may be provided with or may use interlocking features that prevent separation from adjacent mats when in use, to provide a relatively uniform, unbroken working platform across adjacent mats. In the example shown each mat 22 has a plurality of male parts 22D and corresponding female parts 22E in which the respective male parts 22D of an adjacent mat 22 fit into during use when plural mats 22 are laid out on a ground surface to form a network of mats 22. Other interlocking mechanisms may be used, such as tongue and groove or lap joints. Fastening and locking devices may be used to secure adjacent mats together.

During use, access mats may become fouled, for example with one or more dirt, oil or chemicals. It may thus be required to clean such matting before reuse at a new or the same jobsite, to preserve the usefulness, safety, and environmentally-friendly nature, of such mats. Fouled or used mats may also acquire and thus carry unwanted biological material, transporting invasive species, such as undesirable plants, animals, fungi, or insects, over long distances and into possibly environments sensitive to such items. A user may mitigate such risk of site contamination by ensuring that prior to reuse such mats are adequately washed. Washing, which may include sanitization, may be carried out via the application of one or both high pressure and high temperature water (such as steam).

A simple method of washing mats between uses is achieved by a crew of users equipped with manual pressure washers. Such a method may be consumptive of freshwater, may be labor-intensive, and may pose safety risks for workers working on slippery mat surfaces. Heavy equipment may be required to manipulate such mats in this process, for example to hold a fouled mat in position while a pressure washer is used to hose down the exterior surfaces of the mat.

Another method to wash access mats between uses is with automated or semi-automated mat handling and washing systems. Such systems may wash an access mat while the mat is in either a vertical or horizontal orientation. For example, a horizontal mat washing system may comprise a wash bay mounted on a structural frame, with a conveyor belt that drawings s mat in and out of the wash bay. Access mats may be stacked horizontally using heavy equipment and removed once cleaned. The wash bay may comprise pressurized spray nozzles that can be reoriented and repositioned, spray bars, driven brushes, flails, scrapers or tines. Advantages of such systems may include ease of loading and unloading mats or stacks of mats while in the horizontal position and fast throughput with respect to manual pressure-washer washing. A drawback of such systems may be difficulty in draining washing fluid and contaminants from the horizontal top surface of the mat as it is washed. Such systems may also be sensitive to or restricted by the dimensions of the mats to be washed.

Automated wash systems may also move a mat in and out of a wash bay while in a vertical or near vertical position. Such systems facilitate the cleaning and draining of both faces of the mat. Due to the relatively heavy weight of the mats, such systems may require the use of heavy equipment to properly manipulate, for example rotate, the mats during loading and unloading. Such systems may have various other restrictions, such as single mat capacity, and expensive carriage systems.

Referring to FIGS. 1-4 a mat washing system 10 comprises a structural mainframe 12, a mat washing station 14, and a conveyor 16. The structural mainframe 12 may have a suitable structure, such as comprising plural beams and columns arranged to support the various components of the system 10. The mainframe 12 may have an elongate welded structure of a suitable length, such as approximately 60' long along its elongate axis 12A, which may extend between opposed loading and unloading ends 12B and 12C, and parallel to respective sides 12D of the mainframe 12. The sides, base, and ends of the mainframe 12 shown are that of an open lattice, although a partially or fully enclosed structure may be used. The mat washing station 14 may be on, for example defined by, the structural mainframe 12. The mat washing station 14 may be an area designated on the conveyor 16 or mainframe 12 as a location where washing fluids may be applied against a fouled mat 22, such as is provided by wash cabinet 124, which may use a plurality of nozzles (not shown) to apply the washing fluids. The conveyor 16 may be located on the structural mainframe 12. Conveyor 16 may be structured to translate a mat along the mainframe 12 in and out of the washing station 14 while the mat is in an upright position, such as a vertical or near-vertical position.

Referring to FIGS. 1-4, fouled mats may be loaded, cleaned, and unloaded from the system 10 in use by suitable mechanisms or methods. A mat loading swing arm 20 or arms 20 may be mounted to the structural mainframe 12. Arm or arms 20 may be structured to grip a fouled mat 22 that is, in use, stacked on or adjacent a mat loading zone 24 of the structural mainframe 12. Arm or arms 20 may be structured to tilt the fouled mat 22 onto the conveyor 16 into the upright position. Once washed, the fouled mat 22 effectively changes state to a washed mat 22. A mat unloading swing arm 92 or arms 92 may be mounted to the structural mainframe 12. Arm or arms 92 may be structured to grip a washed mat 22 that is, in use, on the conveyor 16 in the upright position. Arm or arms 92 may be structured to move, for example tilt, the washed mat 22 off of the conveyor 16 to stack the washed mat on or adjacent a mat unloading zone 94 of the mainframe 12.

Referring to FIGS. 1-4, in use, a fouled mat 22 may be loaded onto the conveyor 16, washed in the station 14, and unloaded off of the conveyor 16. Arm or arms 20 may grip the fouled mat 22, while the mat 22 is stacked at or adjacent the loading zone 24, for example within a stack 46 of fouled mats 22, for further example in a horizontal or near horizontal orientation. The arm or arms 20 may tilt the mat 22 into an upright position on the conveyor 16. The mat 22 may be conveyed to the mat washing station 14. The fouled mat 22 may be washed at the mat washing station 14. Once washed, the mat (now considered a washed mat 22), may be conveyed away from the mat washing station 14. This method may further comprise using a mat unloading swing arm 92 to tilt a washed mat 22 from the upright position into a stack 85 of washed mats 22 (for example in a horizontal or near-horizontal orientation) at or adjacent a mat unloading zone 94 of the structural mainframe 12.

Referring to FIGS. 1-3, the structural mainframe 12 may comprise a mat loading subframe 48 for receiving a stack 46 of fouled mats 22. The subframe 48 may define the mat loading zone 24. The subframe 48 may form a platform 48F upon which the stack 46 of one or more mats 22 may rest. The subframe 48 may form a cage for receiving the stack of fouled mats. In the example shown, the subframe 48 may be formed by structural members, such as plural columns 48A and beams 48B. A cage may be formed by columns 48A and beams 48B forming mat corner restraints as shown. The subframe 48 may define sides 48C separating loading and conveying ends 48D and 48E, respectively.

Figure 8B:
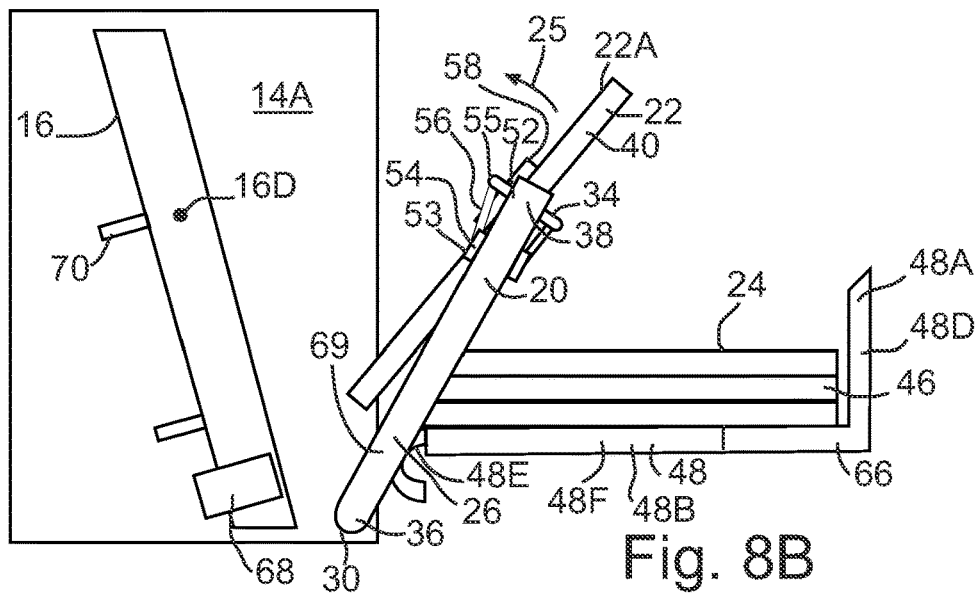
Figure 8C:
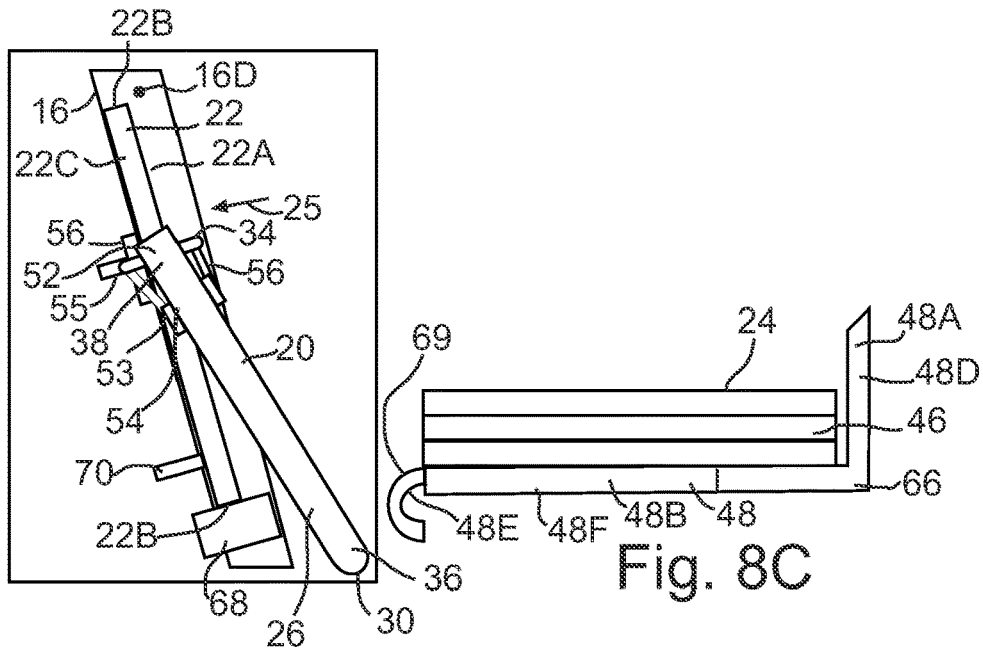

Referring to FIGS. 1-3 and 8A the loading zone 24, such as defined by the subframe 48, may be oriented to feed fouled mats 22 toward a side 16A of the conveyor 16. In the embodiment shown, a fouled mat loading subframe 48 is located adjacent a side of a conveyor 16. Referring to FIGS. 8B-C, when the fouled mat loading subframe 48 is adjacent a side of the conveyor 16, the tilting of a fouled mat 22 to be washed may comprise tilting a fouled mat 22 from a mat loading zone 24 toward and onto a side 16A of the conveyor 16, so that a face 23 of the mat 22 moves in a lateral direction 25, for example perpendicular to a translation axis 16D of conveyor 16, and makes contact with the conveyor 16.

Referring to FIGS. 1-3 and 8A-C, the subframe 48 may be structured to facilitate side-loading of conveyor 16. Subframe 48 may be structured to have an open conveying end 48E opposite a loading end 48D in order to facilitate the movement of mats 22 from subframe 48 to conveyor 16. Referring to FIGS. 8A-C, there may also be one or more loading guides 69 provided on subframe 48 to prevent snagging and/or facilitate transfer of the fouled mats 22 as they are tilted against the conveyor 16. Guides 69 may have a suitable structure, such as formed by round, smooth, tapered, or sloped surfaces to guide a lower longitudinal edge 22B of the mat 22 during loading on the conveyor 16. In the embodiment shown, loading guides 69 may be integrally connected to the mat loading subframe 48. Referring to FIGS. 1-3, in other cases, the mats 22 may be loaded onto an end, such as a feed end 16B of the conveyor 16, such as if arms 20 and loading zone 24 were at loading end 12B of the mainframe 12 and structured to lift mats 22 in an axial direction parallel with translation axis 16D of conveyor 16.

Referring to FIG. 8A, the subframe 48 may be structured to receive mats 22 by a suitable method. For example, the subframe 48 may be structured to receive mats 22 by forklift 146. Referring to FIGS. 1-2 and 8A, the loading end 48D of the subframe 48 may be defined by freestanding columns 48A, which may be spaced a sufficient distance apart to accommodate free passage of forklift tines, a grapple, or excavator bucket. Thus, a forklift or other suitable lifter may lower a stack 46 of mats 22 and withdraw the tines laterally from the subframe 48 leaving the mats 22 in place. In other cases the loading end 48D may be an open end. Generally, the subframe 48 may form a lattice structure as shown, although such structure may in other cases be partially or fully enclosed such as by wall panels.

Referring to FIGS. 1-3 and 8A, the mat loading subframe 48 may be structured to be adjustable in size. The subframe 48 may have extendable and retractable members 66. Referring to FIG. 3, members 66 may be structured to extend and retract, respectively, the mat loading zone 24. The members 66 may be structured to move by telescopic motion. The telescopic subframe members 66 may be used to accommodate system 10 to different sizes of mats. Members 66 may be removed or fully retracted when not in use to reduce the size, for example a lateral width of end 12B of the mat washing system 10 for transport, for example when the mat washing system 10 is transported as or mounted on a trailer. To support the subframe 48 in an extended position, there may be provided loading zone lateral supports 67.

Referring to FIGS. 3, 5A-C, and 8A-C, the mat loading swing arms 20 may be connected by a structural member, such as swing arm base 28, to swing as one unit. Thus, in the embodiment shown, two swing arm members 26 share a common swing arm base 28. A swing arm base 28 may be attached to pivot relative to the structural mainframe 12 by means of a swing arm base hinge 30. The hinge 30 defines a loading swing axis 36. Axis 36 may be parallel or near (substantially) parallel to the translation axis 16D of the conveyor 16. A swing arm base hinge 30 may permit rotation of the swing arm members 26 between two ends of travel, corresponding to alignment with a mat loading zone 24 and alignment with a conveyor 16. Referring to FIG. 8A, swing arm members 26 are shown when aligned with a mat loading zone 24. Referring to FIG. 8C, the swing arm members 26 are shown aligned with the conveyor 16. FIG. 8B shows an intermediate position of swing arm members 26. Referring to FIGS. 1-3, the swing arm 20 may be actuated by one or more actuators, for example swing arm hydraulic cylinders 44. In the side-loading example shown, the actuators and arms 20 move in respective planes perpendicular to the translation axis 16D of the conveyor 16. The base 28 may form an axle that defines loading swing axis 36 as shown, although in other cases the base 28 or other structural member connection between arms 20 may be spaced from the axis 36 in suitable fashion.

Figure 5A:
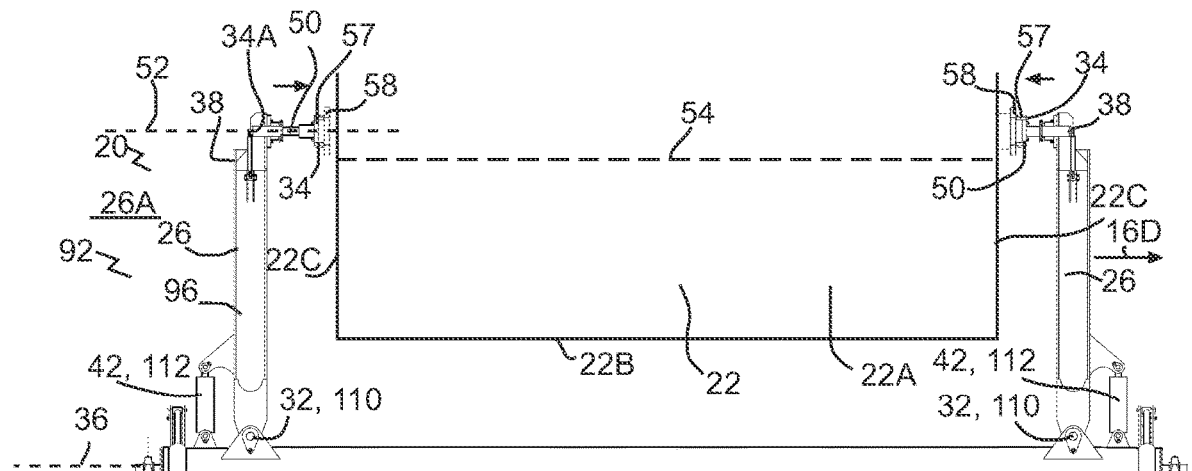
FIGS. 5A-C are top plan views illustrating swing arms moving in a convergent motion (FIG. 5A), gripping a mat (FIG. 5B), and releasing a mat (FIG. 5C).

Referring to FIGS. 5A, 6, and 7, the mat loading swing arms 20 may have respective grippers, such as gripper pads 34. Gripper pads 34 may cooperate to clamp opposed surfaces, such as axial end edges 22C, of the fouled mat 22 to grip the fouled mat 22. In other cases longitudinal edges 22B may be gripped, or edges 22B and 22C may be gripped. At least one gripper pad 34 may be attached to a free end 38 of each swing arm member 26. Gripping may involve clamping the mat 22 in order to hold the mat 22 fixed against relative movement with respect movement with the gripper during use, such as to control the movement of the mat 22. Suitable grippers may incorporate tines, pads, clamps, teeth (shown), v-blocks, and friction locks. In other cases, the mat 22 may be locked to the respective arms 20 by other mechanisms, such as lashing with straps, chains, lashes, hooks, or other items.

Figure 5B:
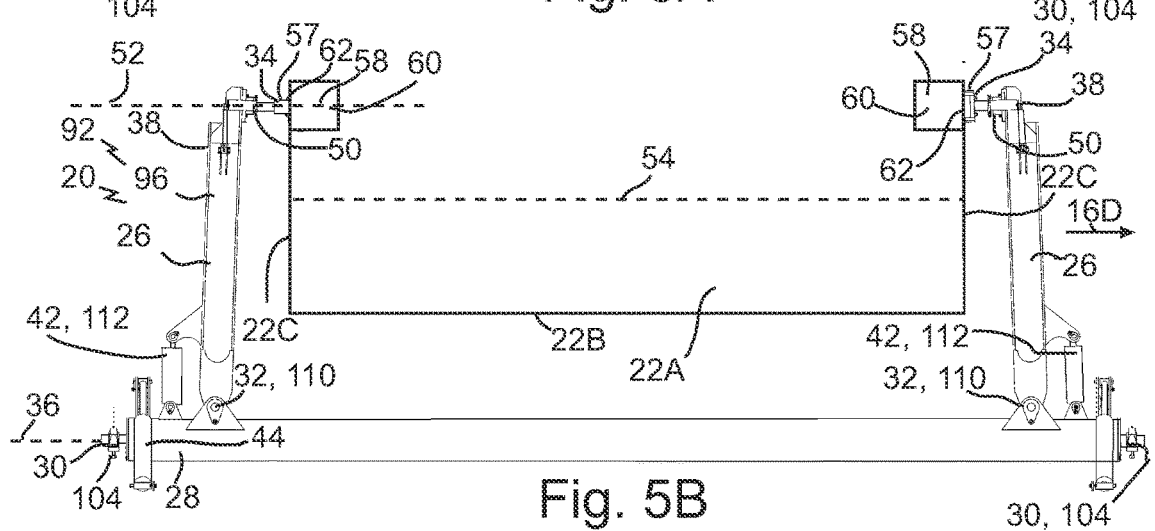
Figure 5C:
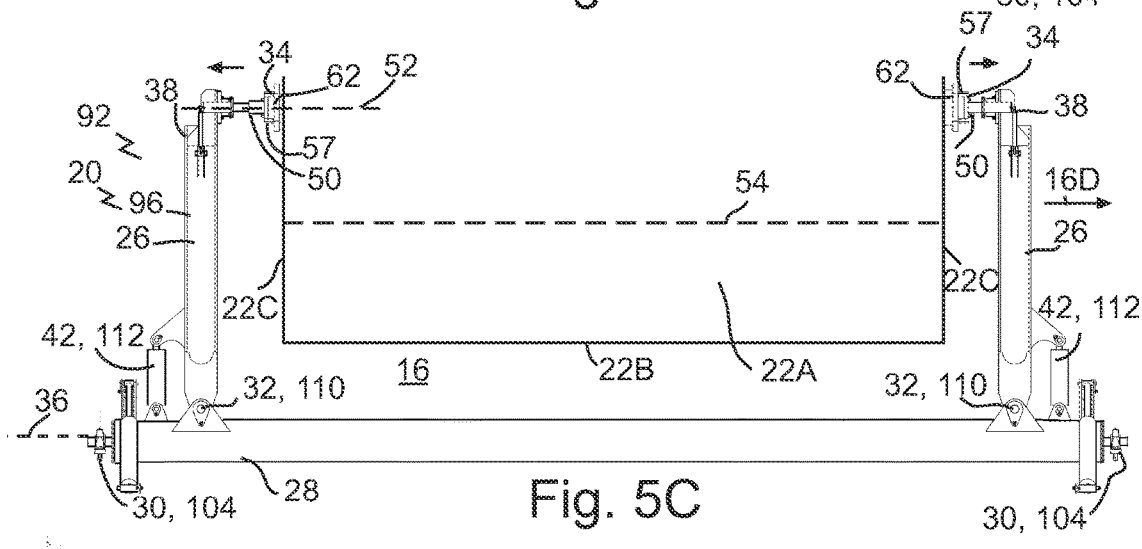

Referring to FIGS. 5A-C, a mechanism may be provided to converge and diverge the respective grippers relative to one another to grip and release, respectively, the fouled mat 22. Swing arm members 26 may be pivotally attached to mainframe 12, for example to a swing arm base 28, by means of at least one swing arm member hinge 32. Hinge 32 may permit rotation of swing arm members 26 in a plane substantially parallel with the faces 22A of fouled mats 22. Such rotation may allow swing arm members 26 to scissor, for example converge and diverge with respect to the edges of fouled mats 22 in mat loading zone 24. By articulating swing arm member hinges 32, it may be possible to grip opposed edges, such as end edges 22C of a fouled mat 22, using gripper pads 34. This may allow fouled mats 22 to be picked up in a way that is relatively insensitive to their width and thickness, to accommodate mats 22 of various length (distance between axial end edges 22C) and width (distance between longitudinal edges 22B) dimensions, various arrangements, spacings, and sizes of male and female parts 22D and 22E, if any, and regardless of position with a stack of fouled mats 22.

Referring to FIGS. 5A-C, an actuator or actuators 42 may be connected to converge and diverge the respective grippers relative to one another. Swing arm members 26 may be equipped with gripper pads 34 that converge to contact opposed axial end edges 22C of fouled mats 22. Referring to FIGS. 5A-5B, by initiating actuator 42, gripper pads 34 move into contact with opposed edges 22C (FIG. 5B). Application of pressure at the gripper pads 34, in this embodiment by way of gripping hydraulic cylinders/actuators 42, may allow the weight of a fouled mat 22 to be supported by a mat loading swing arm 20. In some cases only one arm 20 is actuated, for example to clamp opposed surfaces such as edges or faces of the mat 22. In some cases gripper pads 34 converge and retract by translation along an axis perpendicular to swing arm members 26. Referring to FIG. 5A, each gripper pad 34 may be rigidly mounted to a respective arm 20, or may be pivotally mounted to a swing arm member 26, for example to pivot about a pivot axis 34A perpendicular to a plane 26A of convergent/divergent motion defined by the member 26, in order to adjust the pad 34 to grip mat 22 across a wider range of surface area than if pad 34 did not so pivot. Referring to FIGS. 8A-8C, once mat 22 is gripped, swing arm 20 may be rotated about a loading swing axis 36 until it reaches the position shown in FIG. 8C, at which point a fouled mat 22 may be in a substantially upright position against the conveyor 16. Referring to FIG. 5C, once in this position, swing arm members 26 may rotated oppositely about their respective swing arm member hinges 32, relieving the contact pressure at gripper pads 34 and releasing a fouled mat 22 to be supported by a conveyor 16.

Referring to FIGS. 6-7 and 8A-C, grippers may be mounted to pivot relative to the mat loading swing arm 20. In some embodiments, it is desirable for a fouled mat 22 to passively re-orient itself under the influence of gravity as it is swung about a loading swing axis 36. Such may ensure that the fouled mat 22 is aligned with the conveyor 16 when it reaches the position shown in FIG. 8C. Such may also reduce the influence of the height of a stack 46 of fouled mats 22 on the operation of the mat washing system 10. In an embodiment shown a gripper pad 34 may be attached to a swing arm member 26 through a gripper pad swivel 50, which may permit axial clamping of the fouled mat 22 without restricting free, passive re-orientation of a fouled mat 22 by force of gravity. Referring to FIG. 8B, showing one embodiment at a point in time at which a fouled mat 22 is gripped by a mat loading swing arm 20, passive re-orientation may be facilitated by structuring a mat loading swing arm 20 and a mat loading zone 24 such that gripper pads 34 clamp opposite edges 22C of a fouled mat at a pivot axis 52 that is farther from a loading swing axis 36, of the mat loading swing arms 20, than a center of gravity longitudinal axis 54, which may pass through the center of gravity of the fouled mat 22 parallel to loading swing axis 36. Thus, with a typical mat 22 whose mass is balanced across its dimensions, gripping at such a pivot axis 52 will ensure that the mat 22 hangs from swivels 50 with more mass below than above the swivels 50, permitting automatic and passive self-re-orienting into an upright position during swinging motion onto conveyor 16.

Referring again to FIGS. 6-7 and 8A-C each respective gripper pad 34 may have a dampener to cushion rotation. It may be of use to equip gripper pads 34 with dampeners 56 to cushion rotation of a fouled mat 22 while such mat 22 is moved from a mat loading zone 24 to a conveyor 16. The dampeners 56 may cooperate with gripper pad swivels 50 to permit free but dampened rotation of a fouled mat 22 with respect to mat loading swing arm 20. A suitable dampener may include a hydraulic cylinder filled with oil or other viscous fluid to resist travel of a corresponding piston. A gas-filled cylinder may also be used. A biasing device such as a spring may be provided on each dampener to compel the dampeners to assume a neutral, extended or retracted or otherwise balanced position in the absence of a load from a mat 22. Each dampener 56 may be mounted to a swing arm member 26 by a bracket 53. Referring to FIGS. 6 and 7, pairs of cooperating dampeners 56 may be used on each swing arm member 26, connected to brackets 55, which may be rigidly connected to pivot together about swivel 50 via a structural member 56A. Referring to FIG. 6, an axial dampener 57 may also be provided to cushion the motion of a gripper pad 34 in the direction of clamping. A rubber or other resilient material may be used as the dampener 57.

Referring to FIGS. 5A-B, 6-7, and 8A-C, a respective gripper may have a mat detection sensor or other position sensor. A mat detection sensor 58 may permit automatic or semi-automatic detection of the point in the travel of a mat loading swing arm 20 at which such arm 20 is in sufficient contact or position with the top of a stack 46 of fouled mats 22 at which point a mat 22 may be gripped and tilted/lifted. In an embodiment shown, the mat detection sensor 58 comprises a feeler plate 60 attached to a swing arm member 26 with a feeler plate hinge 62. Although the plate 60 is shown in the retracted position in FIGS. 6 and 7, in use the feeler plate 60 may be extended (perpendicular to pad 34) while arms 20 are swinging down into the position of FIG. 8A, in order to contact the top face 22A of a mat 22 on the top of stack 46. As feeler plate 60 comes into contact with a fouled mat 22, plate 60 may swivel about a feeler plate hinge 62, and in doing so compress a hydraulic cylinder 64, creating a pressure signal that can be detected by the operator or by an electronic control system. Such is one example of the mat detection sensor acting as a limit switch pressure sensor. Other sensors may be used such as proximity sensors, radar sensors, and others. Sensor 58 may act to one or more of detect the loading position such as in FIG. 8A, or detect the unloading position such as in FIG. 8C, where the mat 22 is resting on the conveyor 16 and ready to be conveyed to the washing station 14.

Referring to FIGS. 1-4, 8A-C, 9, and 10, the mat washing system 10 may comprise a conveyor 16 of suitable construction to translate the fouled mats 22 to a mat washing station 14, and from the mat washing station 14 to a mat unloading zone 94. The conveyor 16 may support the fouled mats 22 from below and against at least one mat face 22A, which may maintain such mats 22 in an upright position. The conveyor 16 may include a plurality of rollers, such as support rollers 68 and backing rollers 70, that cooperate to translate the fouled mats 22 along translation axis 16D. Referring to FIGS. 1, 11 and 12, in the embodiment shown, one of more of a plurality of support rollers 68 are driven by drive sprockets 72 (FIG. 11) rigidly affixed to such rollers 68 or otherwise connected to drive rollers 68. A drive chain (not shown) may be used to forcibly drive one or more drive sprockets 72 to translate fouled mats 22 along axis 16D. One or more motors, such as hydraulic motor 76, 90, may be used to rotate a master sprocket 78, which advances drive chain 74 and drive sprockets 72. Other actuators may be used, such as an electric motor. Other power transfer mechanisms may be used, such as gear and shaft, belt and sheave, and other such mechanisms. In some cases the conveyor 16 comprises a belt conveyor, a railed conveyor, a trolley or sliding carriage, or other mechanisms. One or more of smooth or textured rollers may be used. For example, referring to FIG. 2, textured, for example pleated rollers 68A and 80A may be used at the transition between motors 76 and 90.

Referring to FIGS. 1, 11 and 12, portions of the conveyor 16 may be independently controlled relative to one another. Thus, a first drive (motor 76) may be connected to drive a first portion (rollers 68) of the conveyor 16, upstream of the mat washing station 14. A second drive (motor 90) may be connected to drive a second portion (rollers 80) of the conveyor 16, at or downstream of the mat washing station 14, independently of the first drive. The rollers of conveyor 16 may comprise a first set of rollers 68, and a second plurality of support rollers, denoted unloading rollers 80. As a washed mat 22 is conveyed away from a mat washing station 14, it may be desirable to accelerate its travel relative to the conveyance speed prescribed by the advance of drive chain 74 for mats 22 upstream of washing station 14. It may be desirable to reverse the direction of a fouled mat engaged by washing station 14 while a washed mat downstream of station 14 is being translated to unloading zone 94, thus permitting plural mats to be processed by the system 10 at the same time, increasing efficiency and output. Differential spends between fouled and washed mats may create a gap between a washed mat 22 and a fouled mat 22 that may follow it, as multiple mats advance through the mat washing system 10 simultaneously. In this embodiment, one or more unloading rollers 80 are equipped with unloading driven sprockets 84, which can be driven by an unloading drive chain 86 (FIG. 11), which is advanced by the rotation of an unloading master sprocket 88. A rotary actuator or other motor may be used to advance the unloading master sprocket 88, in this embodiment an unloading hydraulic motor 90. The unloading hydraulic motor 90 may be driven at a different speed or direction than the hydraulic motor 76, creating a step change in the speed of a washed mat 22 as it progresses along the conveyor 16.

Figure 13A:
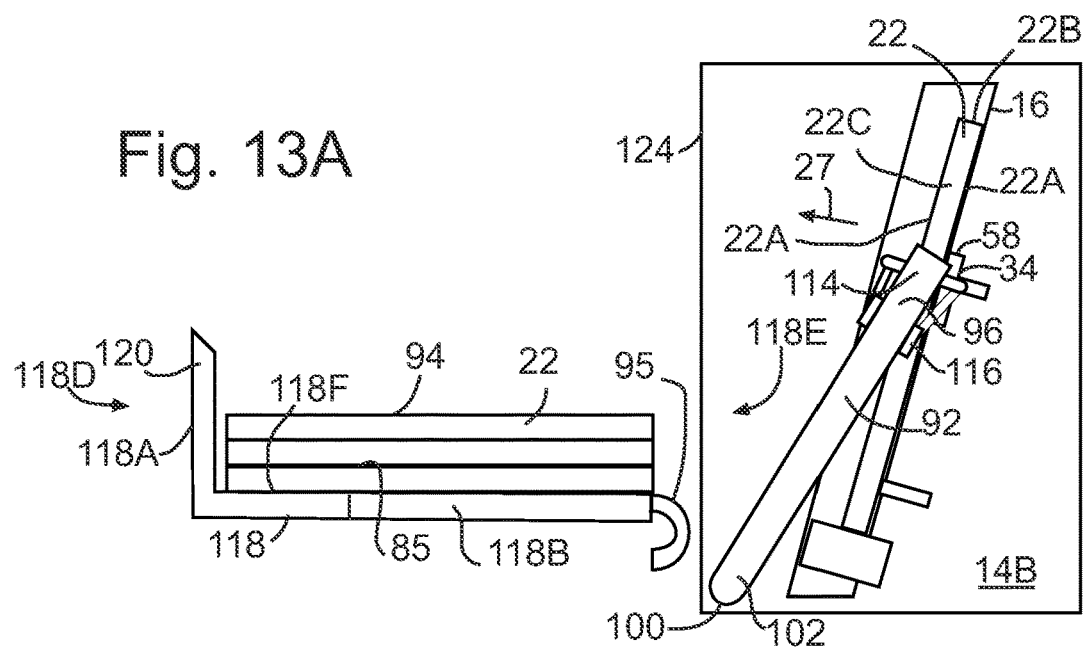
FIGS. 13A-C are a series of end elevation views, of the mat unloading zone of the mat washing system of FIG. 1, illustrating a pair of unloading swing arms gripping a stacked mat on the conveyor (FIG. 11A), tilting the mat away from the conveyor (FIG. 11B), and loading and releasing the mat into a stack on a mat unloading zone of the structural mainframe (FIG. 11C), with the structure in the views simplified for clarity.

Referring to FIGS. 1, 8C, and 9, the mat washing system 10 may comprise a wash station 14. The wash station 14 may be structured to clean a fouled mat 22 that is passing through the wash station 14. Referring to FIGS. 2 and 9, the mat 22 enters a feed end 14A of the washing station 14 and exits an outlet end 14B of the station 14, travelling on conveyor 16. Referring to FIGS. 1, 8A, and 13A, washing station 14 may comprise a wash cabinet 124, which may at least partially contain washing fluid as it is sprayed against the fouled mats 22. Referring to FIG. 11, doors 125 may be provided to access the interior of cabinet 124. Referring to FIGS. 8A and 9, entry and exit ports 14C and 14D, respectively, may be provided in cabinet 124 for entry and exit, respectively, of the mat 22 during washing. Referring to FIG. 9, while located in the wash station 14, a plurality of nozzles 122 may direct pressurized washing fluid against a fouled mat 22, while such mat 22 is in the upright position. Dual series of nozzles 122 are shown, one series for each face 22A of the mat 22. The station 14 may be structured to spray one or more of wash fluid, such as steam, with or without a cleaning agent such as a detergent, and a disinfectant, such as bleach or a preservative agent to prolong the life of mat 22 and to reduce the viability of the mat 22 as a home for an invasive species of plant, animal, fungi, or insect. In use the mat 22 may be driven in both directions along axis 16D in and out of the station 14, until the mat 22 is sufficiently cleaned. A drying device such as a fan may be incorporated in the station 14.

Referring to FIGS. 10A, 10B, and 12, a washing fluids recycling system 126 is shown, which may comprise a fluid collection basin 128 into which used wash fluid can pool. Wash fluid can be collected or drained by means of a drain port 130. A debris removal conveyor 132 may be mounted to separate debris from spent washing fluids in the spent washing fluid collection basin. In the present embodiment, an auger 134 is shown that may be used to drive used wash fluid and contaminant solids up a trough 142 or chute, for example originating at a base point 129 in the basin 128. A debris removal conveyor, such as auger 134, may be oriented to direct debris upward away from, and liquid downward back to, the spent washing fluid collection basin 128. A solids drain port 131 may be provided at or near base point 129. An auger 134 may be driven by a suitable motor, such as an electric motor 136 for example through a right-angle gearbox 138, and may be coupled to the gearbox 138 with a flexible chain coupling 140. The auger 134 may permit liquids to pass down a trough 142 back into a spent washing fluid collection basin 128. The basin 128 may run a suitable portion of the longitudinal length of the system 10, such as from upstream of the washing station 14 to an unloading end 12C of the mainframe 12. Fluids may be recycled by suitable mechanisms, such as one or more of mechanical separation (such as by auger 134), filtration, for example by way of shakers, weirs, or pumped filtration, or settlement, such as in a settling tank. A filter screen may be used, for example provided in a hopper 144 that is located to receive debris solids from auger 134, to remove solids from the used wash fluid. Wash fluid once sufficiently recycled may be redirected to the wash station 14 for reuse, or disposed of.

Referring to FIGS. 1-2 and 4, the structural mainframe 12 may comprise a mat unloading subframe 118 for receiving a stack 85 of washed mats 22. The subframe 118 may define the mat unloading zone 94. The subframe 118 may form a platform 118F upon which the stack 85 of one or more mats 22 may rest after being stacked post-washing through station 14. The subframe 118 may form a cage for receiving the stack of washed mats. In the example shown, the subframe 118 may be formed by structural members, such as plural columns 118A and beams 118B. A cage may be formed by columns 118A and beams 118B forming mat corner restraints as shown. The subframe 118 may define sides 118C separating unloading and conveying ends 118D and 118E, respectively.

Figure 13B:
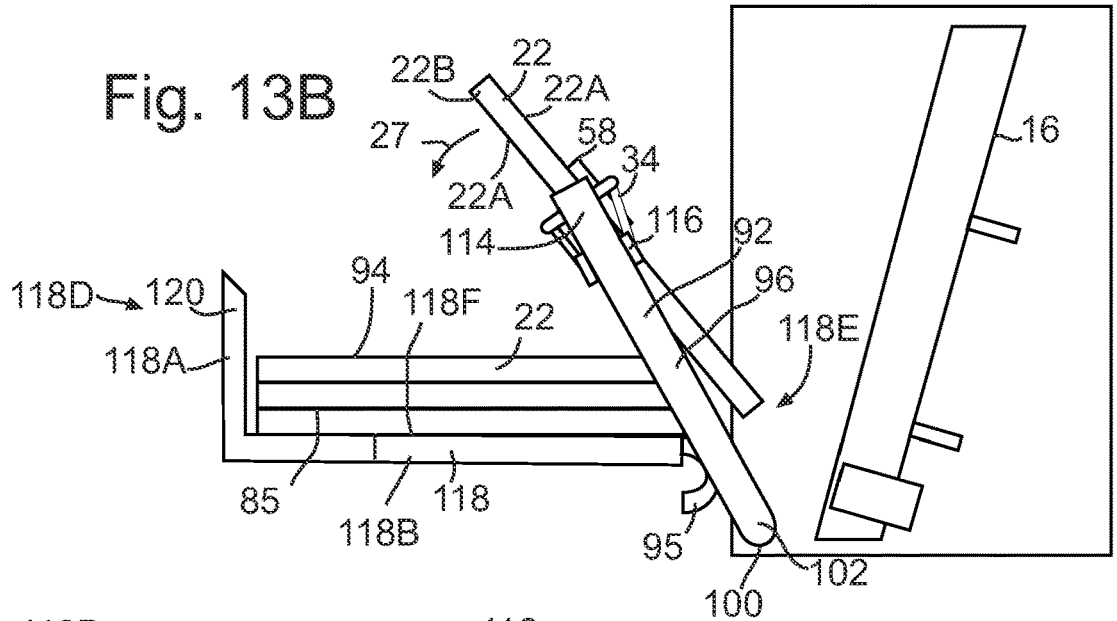
Figure 13C:
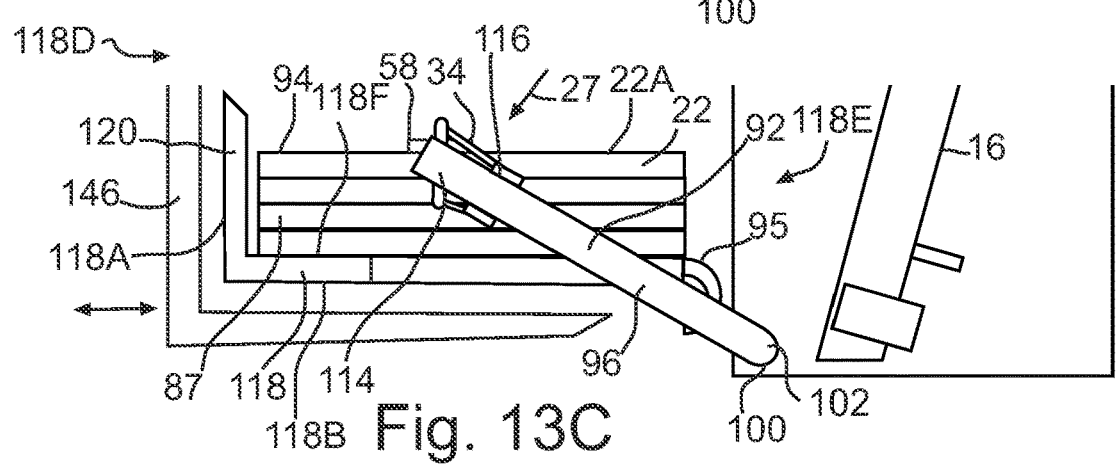

Referring to FIGS. 1-2, 4, and 13A the unloading zone 94, such as defined by the subframe 118, may be oriented to feed washed mats 22 laterally away from a side 16A of the conveyor 16. In the embodiment shown, a washed mat unloading subframe 118 is located adjacent a side 16A of a conveyor 16. Referring to FIGS. 13B-C, when the washed mat unloading subframe 118 is adjacent a side of the conveyor 16, the tilting of a washed mat 22 to be washed may comprise tilting a washed mat 22 in a lateral direction 27 away from a side 16A of the conveyor 16, so that a face 23 of the mat 22 moves in a lateral direction 27, for example perpendicular to a translation axis 16D of conveyor 16, and makes contact with the and moves onto the subframe 118.

Referring to FIGS. 1-2, 4, and 13A-C, the subframe 118 may be structured to facilitate side-unloading of conveyor 16. Subframe 118 may be structured to have an open receiving end 118E opposite an unloading end 118D in order to facilitate the movement of mats 22 from conveyor 16 onto subframe 118. Referring to FIGS. 13A-C, there may also be one or more unloading guides 95 provided on subframe 118 to prevent snagging and/or facilitate transfer of the washed mats 22 as they are tilted away from the conveyor 16 and onto the subframe 118, particularly when dealing with the first mat 22 of a stack 85 of washed mats 22. Guides 95 may have a suitable structure, such as formed by round, smooth, tapered, or sloped surfaces to guide a lower longitudinal edge 22B of the mat 22 during unloading on the conveyor 16. In the embodiment shown, unloading guides 95 may be integrally connected to the mat unloading subframe 118. Referring to FIGS. 1-2, and 4, in other cases, the mats 22 may be unloaded from an end, such as a washed end 16C of the conveyor 16, such as if arms 92 and unloading zone 94 were at unloading end 12C of the mainframe 12 and structured to lift mats 22 in an axial direction parallel with translation axis 16D of conveyor 16.

Referring to FIG. 13A, the subframe 118 may be structured to supply washed mats 22 out of system 10 by a suitable method. For example, the subframe 118 may be structured to have mats 22 picked up and removed by forklift 185. Referring to FIGS. 1-2, 4, and 13A, the unloading end 118D of the subframe 118 may be defined by freestanding columns 118A, which may be spaced a sufficient distance apart to accommodate free passage of forklift tines, a grapple, or excavator bucket. Thus, a forklift or other suitable lifter may insert tines laterally into the subframe 118, and thereafter raise the tines, engaging and raising a stack 85 of mats 22 to withdraw the mats 22 from subframe 118. In other cases the unloading end 118D may be an open end. Generally, the subframe 118 may form a lattice structure as shown, although such structure may in other cases be partially or fully enclosed such as by wall panels.

Referring to FIGS. 1-2, 4, and 13A, the mat unloading subframe 118 may be structured to be adjustable in size. The subframe 118 may have extendable and retractable members 120. Referring to FIG. 4, members 120 may be structured to extend and retract, respectively, the mat unloading zone 94. The members 120 may be structured to move by telescopic motion. The telescopic subframe members 120 may be used to accommodate system 10 to different sizes of mats. Members 120 may be removed or fully retracted when not in use to reduce the size, for example a lateral width of end 12C of the mat washing system 10 for transport, for example when the mat washing system 10 is transported as or mounted on a trailer. To support the subframe 118 in an extended position, there may be provided unloading zone lateral supports 121.

Referring to FIGS. 4, and 11, the mat unloading swing arms 92 may be connected by a structural member, such as swing arm base 104, to swing as one unit. Thus, in the embodiment shown, two swing arm members 26 share a common swing arm base 104. A swing arm base 104 may be attached to pivot relative to the structural mainframe 12 by means of a swing arm base hinge 100. The hinge 30 defines an unloading swing axis 102. Axis 102 may be parallel or near (substantially) parallel to the translation axis 16D of the conveyor 16. A swing arm base hinge 100 may permit rotation of the swing arm members 96 between two ends of travel, corresponding to alignment with a mat unloading zone 94 and alignment with a conveyor 16. Referring to FIG. 13C, swing arm members 96 are shown when aligned with a mat unloading zone 94. Referring to FIG. 13A, the swing arm members 96 are shown aligned with the conveyor 16. FIG. 13B shows an intermediate position of swing arm members 96. Referring to FIGS. 1-2, and 4, the swing arms 92 may be actuated by one or more actuators, for example swing arm hydraulic cylinders 106. In the side-unloading example shown, the actuators and arms 92 move in respective planes perpendicular to the translation axis 16D of the conveyor 16. The base 104 may form an axle that defines unloading swing axis 102 as shown, although in other cases the base 104 or other structural member connection between arms 92 may be spaced from the axis 102 in suitable fashion.

Referring to FIGS. 5A, 6, and 7, the mat unloading swing arms 92 may have respective grippers, such as gripper pads 34. In FIGS. 6 and 7 shown, swing arms 20 are shown but it should be understood that the same principles and features of arms 20 apply to arms 92, as all of the principles and features of the mat loading zone and associated components apply to the mat unloading zone and associated components in this document. Gripper pads 34 may cooperate to clamp opposed surfaces, such as axial end edges 22C, of the washed mat 22 to grip the washed mat 22. In other cases longitudinal edges 22B may be gripped, or edges 22B and 22C may be gripped. At least one gripper pad 34 may be attached to a free end 38 of each swing arm member 96. Gripping may involve clamping the mat 22 in order to hold the mat 22 fixed against relative movement with respect movement with the gripper during use, such as to control the movement of the mat 22. Suitable grippers may incorporate tines, pads, clamps, teeth (shown), v-blocks, and friction locks. In other cases, the mat 22 may be locked to the respective arms 92 by other mechanisms, such as lashing with straps, chains, lashes, hooks, or other items.

Referring to FIGS. 5A-C, a mechanism may be provided to converge and diverge the respective grippers relative to one another to grip and release, respectively, the washed mat 22. Swing arm members 96 may be pivotally attached to mainframe 12, for example to a swing arm base 104, by means of at least one swing arm member hinge 110. Hinge 110 may permit rotation of swing arm members 26 in a plane substantially parallel with the faces 22A of washed mats 22. Such rotation may allow swing arm members 26 to converge and diverge with respect to the edges of washed mats 22 in mat unloading zone 94. By articulating swing arm member hinges 110, it may be possible to grip opposed edges, such as end edges 22C of a washed mat 22, using gripper pads 34. This may allow washed mats 22 to be picked up in a way that is relatively insensitive to their width and thickness, to accommodate mats 22 of various length (distance between axial end edges 22C) and width (distance between longitudinal edges 22B) dimensions, various arrangements, spacings, and sizes of male and female parts 22D and 22E, if any, and regardless of position with a stack 85 of washed mats 22.

Referring to FIGS. 5A-C, an actuator or actuators 112 may be connected to converge and diverge the respective grippers relative to one another. Swing arm members 26 may be equipped with gripper pads 34 that converge to contact opposed axial end edges 22C of washed mats 22. Referring to FIGS. 5A-5B, by initiating actuator 112, gripper pads 34 move into contact with opposed edges 22C (FIG. 5B). Application of pressure at the gripper pads 34, in this embodiment by way of gripping hydraulic cylinders/actuators 112, may allow the weight of a washed mat 22 to be supported by a mat unloading swing arm 92. In some cases only one arm 92 is actuated, for example to clamp opposed surfaces such as edges or faces of the mat 22. In some cases gripper pads 34 converge and retract by translation along an axis perpendicular to swing arm members 26. Referring to FIG. 5A, each gripper pad 34 may be rigidly mounted to a respective arm 92, or may be pivotally mounted to a swing arm member 96, for example to pivot about a pivot axis 34A perpendicular to a plane 26A of convergent/divergent motion defined by the member 96, in order to adjust the pad 34 to grip mat 22 across a wider range of surface area than if pad 34 did not so pivot. Referring to FIGS. 13A-C, once mat 22 is gripped, swing arm 92 may be rotated about an unloading swing axis 102 until it reaches the position shown in FIG. 8C, at which point a washed mat 22 has moved from a substantially upright position against the conveyor 16 (FIG. 13A) to a horizontal position shown in FIG. 13C. Referring to FIG. 5C, once in this position, swing arm members 96 may rotated oppositely about their respective swing arm member hinges 110, relieving the contact pressure at gripper pads 34 and releasing a washed mat 22 to be supported by subframe 118.

Referring to FIGS. 6-7 and 13A-C, grippers may be mounted to pivot relative to the mat unloading swing arm 92. In some embodiments, it is desirable for a washed mat 22 to passively re-orient itself under the influence of gravity as it is swung about an unloading swing axis 102. Such may ensure that the washed mat 22 is aligned with the conveyor 16 when it leaves the position shown in FIG. 13A and travels to the position of FIG. 13C. Such may also reduce the influence of the height of a stack 85 of washed mats 22 on the operation of the mat washing system 10. In an embodiment shown a gripper pad 34 may be attached to a swing arm member 96 through a gripper pad swivel 50, which may permit axial clamping of the washed mat 22 without restricting free, passive re-orientation of a washed mat 22 by force of gravity. Referring to FIG. 13B, showing one embodiment at a point in time at which a washed mat 22 is gripped by a mat unloading swing arm 92, passive re-orientation may be facilitated by structuring a mat unloading swing arm 92 and a mat unloading zone 94 such that gripper pads 34 clamp opposite edges 22C of a washed mat at a pivot axis 114 that is farther from a unloading swing axis 102, of the mat unloading swing arms 92, than a center of gravity longitudinal axis 116, which may pass through the center of gravity of the washed mat 22 parallel to unloading swing axis 102. Thus, with a typical mat 22 whose mass is balanced across its dimensions, gripping at such a pivot axis 114 will ensure that the mat 22 hangs from swivels 50 with more mass below than above the swivels 50, permitting automatic and passive self-re-orienting into an upright position during swinging motion onto conveyor 16.

Referring again to FIGS. 6-7 and 13A-C each respective gripper pad 34 may have a dampener to cushion rotation. It may be of use to equip gripper pads 34 with dampeners 56 to cushion rotation of a washed mat 22 while such mat 22 is moved from a mat unloading zone 94 to a conveyor 16. The dampeners 56 may cooperate with gripper pad swivels 50 to permit free but dampened rotation of a washed mat 22 with respect to mat unloading swing arm 92. A suitable dampener may include a hydraulic cylinder filled with oil or other viscous fluid to resist travel of a corresponding piston. A biasing device such as a spring may be provided on each dampener to compel the dampeners to assume a neutral, extended or retracted or otherwise balanced position in the absence of an unload from a mat 22. Each dampener 56 may be mounted to a swing arm member 26 by a bracket 53. Referring to FIGS. 6 and 7, pairs of cooperating dampeners 56 may be used on each swing arm member 96, connected to brackets 55, which may be rigidly connected to pivot together about swivel 50 via a structural member 56A. Referring to FIG. 6, an axial dampener 57 may also be provided to cushion the motion of a gripper pad 34 in the direction of clamping.

Referring to FIGS. 5A-B, 6-7, and 13A-C, a respective gripper may have a mat detection sensor or other position sensor. A mat detection sensor 58 may permit automatic or semi-automatic detection of the point in the travel of a mat unloading swing arm 92 at which such arm 92 is in sufficient contact or position with the face 22A of a washed mat 22 at which point a mat 22 may be gripped and tilted/lowered. In an embodiment shown, the mat detection sensor 58 comprises a feeler plate 60 attached to a swing arm member 26 with a feeler plate hinge 62. Although the plate 60 is shown in the retracted position in FIGS. 6 and 7, in use the feeler plate 60 may be extended (perpendicular to pad 34) while arms 92 are swinging up into the position of FIG. 13A, in order to contact the face 22A of a mat 22 on the conveyor 16. As feeler plate 60 comes into contact with a washed mat 22, plate 60 may swivel about a feeler plate hinge 62, and in doing so compress a hydraulic cylinder 64, creating a pressure signal that can be detected by the operator or by an electronic control system. Such is one example of the mat detection sensor acting as a limit switch pressure sensor. Other sensors may be used such as proximity sensors, radar sensors, and others. Sensor 58 may act to one or more of detect the loaded position such as in FIG. 13A, or detect the unloading position such as in FIG. 13C, where the mat 22 is resting on the stack 85 and ready to be removed from the system 10.

Referring again to FIG. 1, the mat washing system 10 may comprise a conveyor 16 that is structured to translate the mat while it is in an upright position. A suitable upright position may be when the mat 22 is tilted between 95 and 135 degrees from the horizontal. In other cases the mat 22 may be tilted between 45 and 95 degrees from the horizontal. A tilted, upright orientation may permit draining of used wash fluids while permitting gravity to retain the mat 22 in position with a one-sided conveyor, that is a conveyor that is not required to enclose and cage both faces 22A of the mat 22 to retain the mat 22 in place on conveyor 16.

Referring to FIG. 6b, the mat washing system 10 may comprise a wash station 14, through which fouled mats 22 can pass. While located at the wash station 14, a plurality of nozzles 122 may direct pressurized washing fluid against a fouled mat 22, while it is in the upright position. A wash cabinet 124 may at least partially contain washing fluid as it is sprayed against the fouled mats 22.

Referring to FIGS. 10-12, a drainage and filtration system 126 is shown, which may comprise a fluid collection basin 128 into which used wash fluid can pool. Wash fluid can be collected or drained by means of a drain port 130. A debris removal conveyor 132 may be mounted to separate debris from spent washing fluids in the spent washing fluid collection basin. In the present embodiment, an auger 134 is shown that may be used to drive used wash fluid and contaminant solids up a trough 142. An auger 134 may be driven by an electric motor 136 through a right-angle gearbox 138, and may be coupled to the gearbox 138 with a flexible chain coupling 140. The auger 134 may permit liquids to pass down a trough 142 back into a spent washing fluid collection basin 128. Further external filtration may occur, for example by way of shakers, weirs, settlement vessels, or pumped filtration. A filter screen, such as located in hopper 144, may be used to remove solids from the used wash fluid. Wash fluid once filtered can be recycled and redirected to the wash station 14 for reuse.

Referring to FIG. 1, system 10 may be made to be portable or mobile. Improved portability may be helpful for transportation between job sites, for instance using a tractor-trailer. The mat washing system 10 may be constructed such that the structural mainframe 12 forms a modular skid. The system 10 may be mounted on a trailer, or may form part of a trailer, for example if the mainframe 12 had ground engaging wheels and road lights. Referring to FIGS. 3-4, for versatility at the job site, the structural mainframe 12 may be height adjustable, for example if equipped with extensible foundation members 13 that can extend and retract to raise and lower the entire mat washing system 10. The extensible foundation members may be actuated by pressurizing one or more elevation cylinders 15. Outriggers (not shown) may be incorporated for lateral stability.

The described methods of washing mats using mat washing system 10 may further comprise stacking fouled mats at a loading zone using a forklift or other heavy equipment, and may also comprise removing washed mats from an unloading zone using a forklift or other heavy equipment such as an excavator bucket or grapple.

A wash station may comprise infrastructure to wash a mat, or a zone at which point a mat is to be washed. The use of words such as top, bottom, rear, side, end, vertical, horizontal, parallel, and perpendicular are not intended to be limited to absolute meanings unless context dictates otherwise, and nominal deviations from such absolutes are permitted even when absolute definitions are applied. A stack is understood to refer to a horizontal or substantially horizontal face to face arrangement of two or more mats. Operation of any one of the parts of the system or methods disclosed herein may be done by manual or automatic control, or a combination of both. A controller, such as a programmable logic controller, may be used to coordinate the different parts of the system 10 and method. Remote control, such as using a mobile phone application or dedicated console unit, may be used.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A mat washing system comprising:
   a structural mainframe;
   a mat washing station;
   a conveyor structured to translate a mat, while the mat is an upright position, along the structural mainframe through the mat washing station; and
   a mat loading swing arm on the structural mainframe and structured to grip, using at least one gripper, a fouled mat, which in use is stacked on or adjacent a mat loading zone of the structural mainframe, and tilt the fouled mat onto the conveyor into the upright position.

2. The mat washing system of claim 1 in which the mat loading swing arm comprises two mat loading swing arms having respective grippers, that cooperate to clamp opposed surfaces of the fouled mat to grip the fouled mat.

3. The mat washing system of claim 2 in which:
   the mat loading zone is adjacent a side of the conveyor; and
   the mat loading swing arms are structured to tilt the fouled mat from the mat loading zone so that a face of the fouled mat moves in a lateral direction toward and onto the side of the conveyor.

4. The mat washing system of claim 2 in which the mat loading swing arms are structured to clamp opposed end edges of the fouled mat to grip the fouled mat.

5. The mat washing system of claim 2 further comprising an actuator or actuators connected to converge and diverge the respective grippers relative to one another to grip and release, respectively, the fouled mat.

6. The mat washing system of claim 2 in which each respective gripper is mounted to pivot relative to the mat loading swing arm.

7. The mat washing system of claim 2 in which the mat loading swing arms are structured to swing about a loading swing axis that is parallel to a translation axis of the conveyor.

8. The mat washing system of claim 1 further comprising:
   a first drive connected to drive a first portion of the conveyor, upstream of the mat washing station; and
   a second drive connected to drive a second portion of the conveyor, at or downstream of the mat washing station, independently of the first drive.

9. The mat of claim 1 further comprising a mat unloading swing arm on the structural mainframe and structured to grip a washed mat, which in use is on the conveyor in the upright position, and stack the washed mat on or adjacent a mat unloading zone of the structural mainframe.

10. The mat washing system of claim 9 in which the mat unloading swing arm comprises two mat unloading swing arms having respective grippers that cooperate to clamp opposed surfaces of the mat to grip the washed mat.

11. The mat washing system of claim 9:
    in which the mat unloading swing arms are structured to clamp opposed end edges of the washed mat to grip the washed mat;
    further comprising an actuator or actuators connected to converge and diverge the respective grippers relative to one another to grip and release, respectively, the washed mat; and
    in which each respective gripper is mounted to permit passive motion of the respective gripper and washed mat relative to the mat unloading swing arm by force of gravity.

12. The mat washing system of claim 1 in which the mat washing station comprises a plurality of nozzles oriented to direct washing fluids against the fouled mat while the fouled mat is the upright position.

13. The mat washing system of claim 1 further comprising:
    a spent washing fluid collection basin associated with the conveyor; and
    a debris removal conveyor mounted to separate debris from spent washing fluids from the spent washing fluid collection basin.

14. A method comprising using the mat washing system of claim 1 to wash a fouled mat.

15. A method comprising:
    using at least one gripper to grip a fouled mat, which is stacked on or adjacent a mat loading zone of a structural mainframe, using a mat loading swing arm on the structural mainframe;

tilting the fouled mat, using the mat loading swing arm, into an upright position onto a conveyor of the structural mainframe;
conveying the fouled mat to a mat washing station; and
washing the fouled mat in the mat washing station to produce a washed mat.

16. The method of claim 15 in which:
the mat loading swing arm comprises two mat loading swing arms each having a respective gripper; and
gripping comprises converging the respective grippers to clamp opposed end edges of the fouled mat.

17. The method of claim 16 in which:
during gripping, the fouled mat is located within a stack of fouled mats received within a mat loading subframe of the structural mainframe;
the mat loading subframe is adjacent a side of the conveyor; and
tilting comprises tilting the fouled mat from the mat loading zone so that a face of the fouled mat moves in a lateral direction toward and onto the side of the conveyor.

18. The method of claim 16:
in which the fouled mat is washed at the mat washing station using washing fluids; and
further comprising collecting and recycling spent washing fluids.

19. The method of claim 16 further comprising:
conveying the washed mat away from the mat washing station;
gripping the washed mat using a mat unloading swing arm on the structural mainframe; and
tilting the washed mat, using the mat unloading swing arm, from the upright position into a stack of washed mats at or adjacent a mat unloading zone of the structural mainframe.

20. The method of claim 19 in which:
the mat unloading swing arm comprises two mat unloading swing arms having respective grippers; and
gripping the washed mat comprises converging the respective grippers to clamp opposed end edges of the washed mat.

* * * * *